(12) United States Patent
Pechanek et al.

(10) Patent No.: US 8,671,266 B2
(45) Date of Patent: Mar. 11, 2014

(54) STAGING REGISTER FILE FOR USE WITH MULTI-STAGE EXECUTION UNITS

(75) Inventors: Gerald George Pechanek, Cary, NC (US); Stamatis Vassiliadis, Pijnacker (NL)

(73) Assignee: Altera Corporation, San Jose, CA (US)

( * ) Notice: Subject to any disclaimer, the term of this patent is extended or adjusted under 35 U.S.C. 154(b) by 128 days.

(21) Appl. No.: 13/110,219

(22) Filed: May 18, 2011

(65) Prior Publication Data
US 2011/0225396 A1    Sep. 15, 2011

Related U.S. Application Data

(60) Continuation of application No. 12/499,875, filed on Jul. 9, 2009, now Pat. No. 7,962,723, which is a division of application No. 10/773,673, filed on Feb. 6, 2004, now Pat. No. 7,577,824, which is a continuation of application No. 10/657,491, filed on Sep. 8, 2003, now abandoned.

(51) Int. Cl.
*G06F 15/00* (2006.01)
*G06F 15/76* (2006.01)

(52) U.S. Cl.
USPC .......................................................... 712/24

(58) Field of Classification Search
None
See application file for complete search history.

(56) References Cited

U.S. PATENT DOCUMENTS 6,170,051 B1 * 1/2001 Dowling ...................... 712/225
6,615,338 B1 * 9/2003 Tremblay et al. ............... 712/24

* cited by examiner

*Primary Examiner* — Corey S Faherty
(74) *Attorney, Agent, or Firm* — Law Offices of Peter H. Priest, PLLC

(57) ABSTRACT

Techniques are described for decoupling fetching of an instruction stored in a main program memory from earliest execution of the instruction. An indirect execution method and program instructions to support such execution are addressed. In addition, an improved indirect deferred execution processor (DXP) VLIW architecture is described which supports a scalable array of memory centric processor elements that do not require local load and store units.

20 Claims, 23 Drawing Sheets

FIG. 1

```
10
     i     ADD  R1, R2, R3   ⎫
     i+1   SUB  R4, R5, R6   ⎬ 12
     i+2   LD   R7(R3)       ⎪ SCALAR
     i+3   BRA  IF R4>0      ⎭ CODE i+4   FLOAD FR1 (R32)   ⎫
     i+5   FLADD FR1, FR2, FR3 ⎬ 14
     i+6   FLMUL FR7, FR8, FR9 ⎭ FLOATING
                                POINT
                                CODE
```

FIG. 2

```
20
     :
     SCALAR CODE          ⎬ 22  CODE SEGMENT 1
     :
     FLOATING POINT CODE  ⎬ 24  CODE SEGMENT 2
     :

j     Execute 1    ─ 26 j+1   Execute 2    ─ 28
     :
```

FIG. 6A (PRIOR ART)

32-bit Encoding

| 31 30 29 28 27 26 25 24 23 | 22 21 20 19 18 | 17 16 15 14 13 | 12 11 10 9 8 | 7 6 5 4 | 3 2 1 0 |
|---|---|---|---|---|---|
| GROUPS/P UNIT  MAUopcode | Rt | Rx | Ry | CE3 | SumpExt |
|  | Rte | Rxe | Rye 0 | 0 |  |

SLAMDunk 40-bit Encoding Example

| 39 38 37 36 35 34 33 32 31 30 29 28 27 26 25 24 23 | 22 21 20 19 18 | 17 16 15 14 13 | 12 11 10 9 8 | 7 6 5 4 | 3 2 1 0 |
|---|---|---|---|---|---|
| GROUPS/P UNIT  MAUopcode' | Rt' | Rx' | Ry' | CE3 | SumpExt' |
|  | Rte' | Rxe' | Rye' 0 | 0 |  |

610
612  614

FIG. 6C 32-bit Mapping to SLAMDunk 40-bit Encoding Example

| 39 38 37 36 35 34 33 32 31 30 29 28 27 | 26 25 24 23 | 22 21 20 19 18 | 17 16 15 14 13 | 12 11 10 9 8 | 7 6 5 4 | 3 2 1 0 |
|---|---|---|---|---|---|---|
| GROUPS/P UNIT 0  MAUopcode | 0 0 0 | Rt | Rx | Ry | CE3 | SumpExt' |
|  | 0 0 0 | Rte | Rxe | Rye 0 | 0 |  |

XV 4/6-SLOT WITH RFI VLIW/VECTOR OPERATIONS-ENCODING — 1000

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| S/P | XV1-4slot | ? | ? | E3 | E2 | E1 | E0 | $V_b$ | UAF | $V_x$ | $R_b$ | 6-BIT RFIMoffs | 9-BIT VIMBoffs |
| | XV2-6slot | E5 | E4 | E3 | E2 | E1 | E0 | | | | | | |

XV 4/6-SLOT WITH VLIW OPERATIONS-ENCODING — 1050

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| S/P | XV3-4slot | ? | ? | E3 | E2 | E1 | E0 | $V_b$ | UAF | $V_x$ | ? ? | 9-BIT VIMBoffs |
| | XV4-6slot | E5 | E4 | E3 | E2 | E1 | E0 | | | | | |

1052, 1054

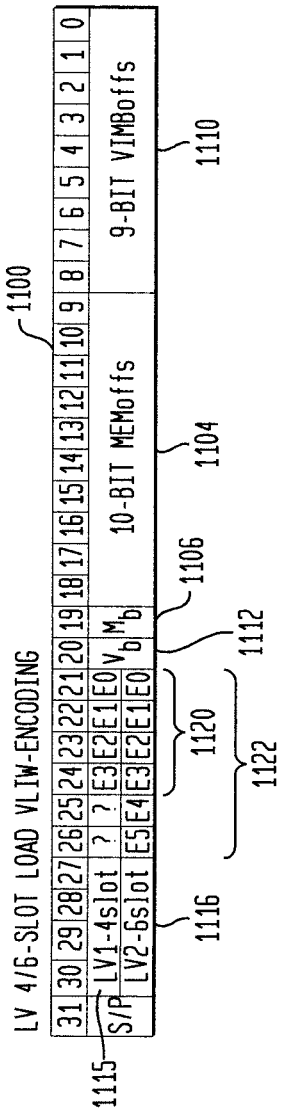
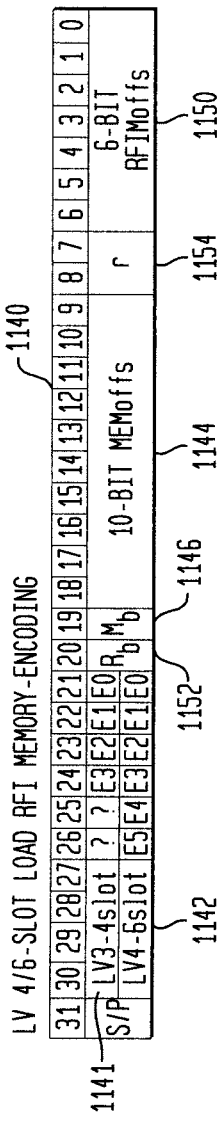
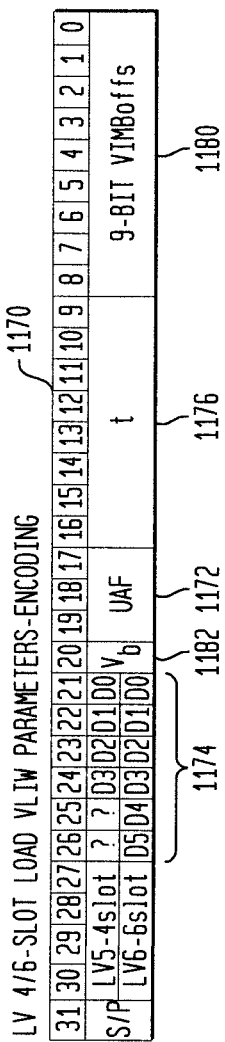

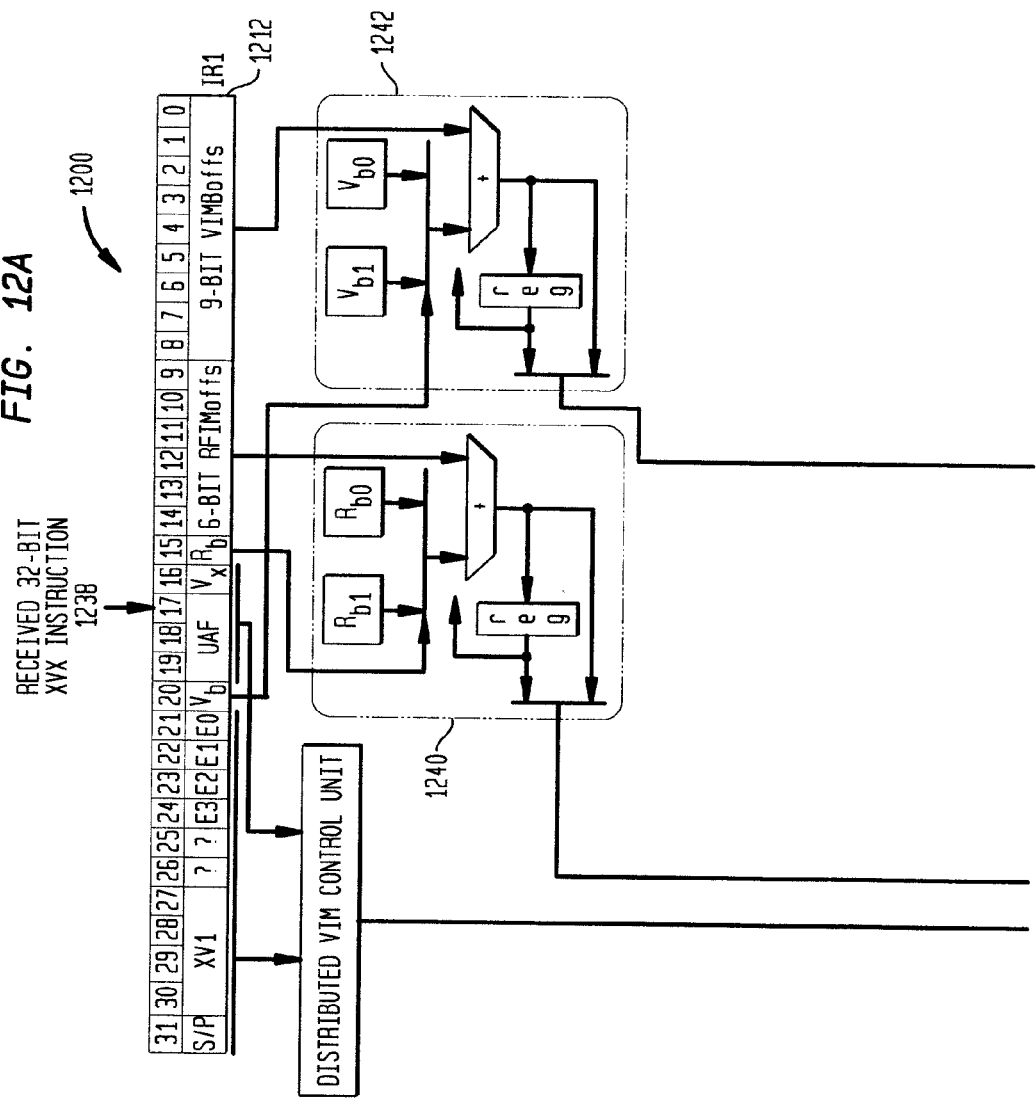

STAGING REGISTER FILE FOR USE WITH MULTI-STAGE EXECUTION UNITS

RELATED APPLICATIONS

The present application is a continuation of and claims the benefit of and priority to U.S. Ser. No. 12/499,875 filed Jul. 9, 2009 which is a divisional of U.S. Ser. No. 10/773,673 filed Feb. 6, 2004 issued as U.S. Pat. No. 7,577,824 which is a continuation of U.S. Ser. No. 10/657,491 filed Sep. 8, 2003 now abandoned all of which are incorporated herein by reference in their entirety.

FIELD OF THE INVENTION

The invention relates generally to techniques for improving processor performance and scalability. More particularly, the present invention relates to advantageous approaches for decoupling the fetching of instructions and their earliest execution, as well as, various advantageous aspects of an improved indirect execution architecture.

BACKGROUND OF THE INVENTION

In general, the problem of how to improve a processor's performance over standard techniques, for example, the problems of how to make a design that is more scalable, how to extend the design with new instructions, and how to simplify a processor's implementation are important processor development issues that need to be solved for future processor products. One important reason why instruction and program execution is held back from reaching higher performance levels is that in the sequential code execution model that is inherent in today's commercially available processors, fetched instructions are required to be executed at the earliest possible time in a manner which does not violate the logical program flow. This requirement tightly couples the fetching of instructions with their scheduled execution at the earliest possible time in a pipeline flow. In typical operation under this sequential code execution model, a fetched instruction, even if it is among a group of fetched instructions and even if the implementation supports out of order execution, is still scheduled for execution as quickly as possible. This coupling of an instruction fetched from program memory with its earliest possible execution in pipelines of varying depth and complexity is one of the key attributes of such current designs that affect their performance, scalability, extensibility, and difficulty of implementation.

SUMMARY OF THE PRESENT INVENTION

While it may seem counterintuitive, among its several aspects, the present invention describes a unique way to decouple the fetching of a program's instruction or set of instructions, normally stored in the main program memory using standard prior art techniques, from the instruction's earliest execution. This decoupling provides a mechanism to improve processor performance.

In one aspect of the invention, to accomplish this decoupling, a program consisting of K instructions is partitioned into code segments, each segment consisting of one or more instructions, that are to be executed by a processor. Such a code segment is denoted as code segment i. Consider the following general view of a program partitioned into multiple code segments i=1 to N:

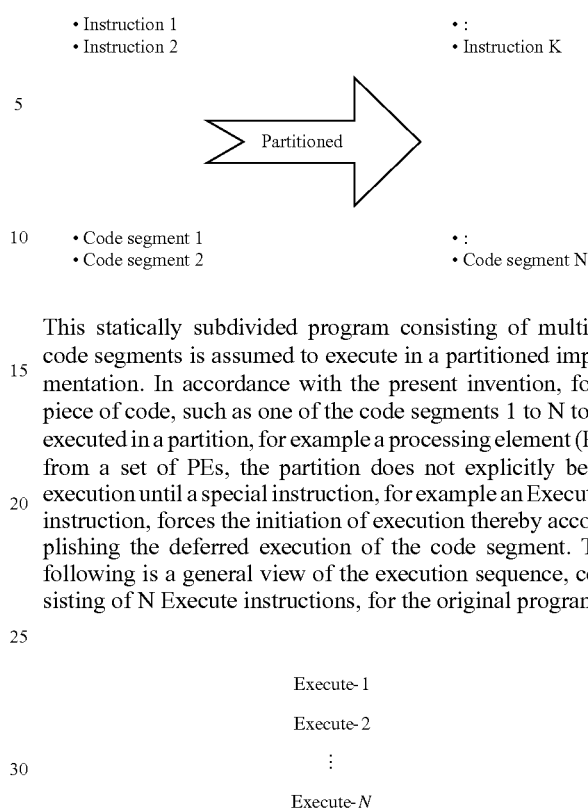

This statically subdivided program consisting of multiple code segments is assumed to execute in a partitioned implementation. In accordance with the present invention, for a piece of code, such as one of the code segments 1 to N to be executed in a partition, for example a processing element (PE) from a set of PEs, the partition does not explicitly begin execution until a special instruction, for example an Execute-i instruction, forces the initiation of execution thereby accomplishing the deferred execution of the code segment. The following is a general view of the execution sequence, consisting of N Execute instructions, for the original program:

$$\text{Execute-}1$$
$$\text{Execute-}2$$
$$\vdots$$
$$\text{Execute-}N$$

This deferred execution constitutes the first difference of the present invention with respect to the typical operation of sequential processors discussed above.

When compared to the prior art technique of storing the program's instructions in a processor's instruction memory and fetching and scheduling them for their earliest execution, this deferring of execution decouples the accessing of the program instructions from their immediate or earliest execution since the intermediary Execute-i instructions control when the program's instructions are to be executed. The forcing of execution or deferred execution by means of special instructions can be implemented in a number of ways, for example, by an indirect execution mechanism. Further, this decoupling and execution in partitions allows for improvements in the storage of a program's instructions in local and global memory designs for improved performance in processor systems.

It is further noted that present processor architectures are not generally scalable. But, the current approach with the decoupled indirect execution architecture can resolve such a problem in numerous applications. The decoupling allows for instruction set extensions that could not be normally stored and fetched in the previous sequential fetch/execution model that coupled the instruction fetching with earliest execution. The decoupling also improves the ability to scale a processor design through the decoupled storage of code segments local to partitioned execution elements or processing elements. It further allows the ability to control the initiation of code segment execution among subsets of processing elements.

While a superscalar processor, a first exemplary load/store register-file based array VLIW processor, also referenced as the SLAMDunk1 processor or Deferred eXecution Processor-1 (DXP1), and a second exemplary memory-centric array VLIW processor, also referenced as the SLAMDunk2 processor or Deferred eXecution Processor-2 (DXP2), are described in detail below to demonstrate the basics of the deferred execution architecture, it will be recognized that the approach described herein is general and applicable to scalar with superscalar implementations, array, vector, and very long instruction word (VLIW) processor designs with the addition of appropriate instructions consistent with the teachings herein.

A more complete understanding of the present invention, as well as other features, aspects and advantages of the invention, will be apparent from the following Detailed Description and the accompanying drawings.

BRIEF DESCRIPTION OF THE DRAWINGS

FIG. 1 illustrates a sequence of code instructions including scalar and floating point code;

FIG. 2 illustrates the restructuring or partitioning of code such as that of FIG. 1 into code segments and corresponding execute instructions to support deferred execution;

FIGS. 6A-6C illustrate a prior art MAU SUM 2PA instruction encoding, an exemplary expansion of this instruction according to the present invention, and a mapping to illustrate the relationship between the two instructions, respectively;

FIG. 10A illustrates an XV 4/6 slot with RFI VLIW/Vector Operations instruction encoding;

FIG. 10B illustrates an XV 4/6 slot with VLIW Operations instruction encoding;

FIG. 11A illustrates an LV 4/6 slot Load VLIW instruction encoding;

FIG. 11B illustrates an LV 4/6 slot Load RFI Memory instruction encoding;

FIG. 11C illustrates an LV 4/6 slot Load VLIW Parameter instruction encoding;

DETAILED DESCRIPTION

Figure 3:
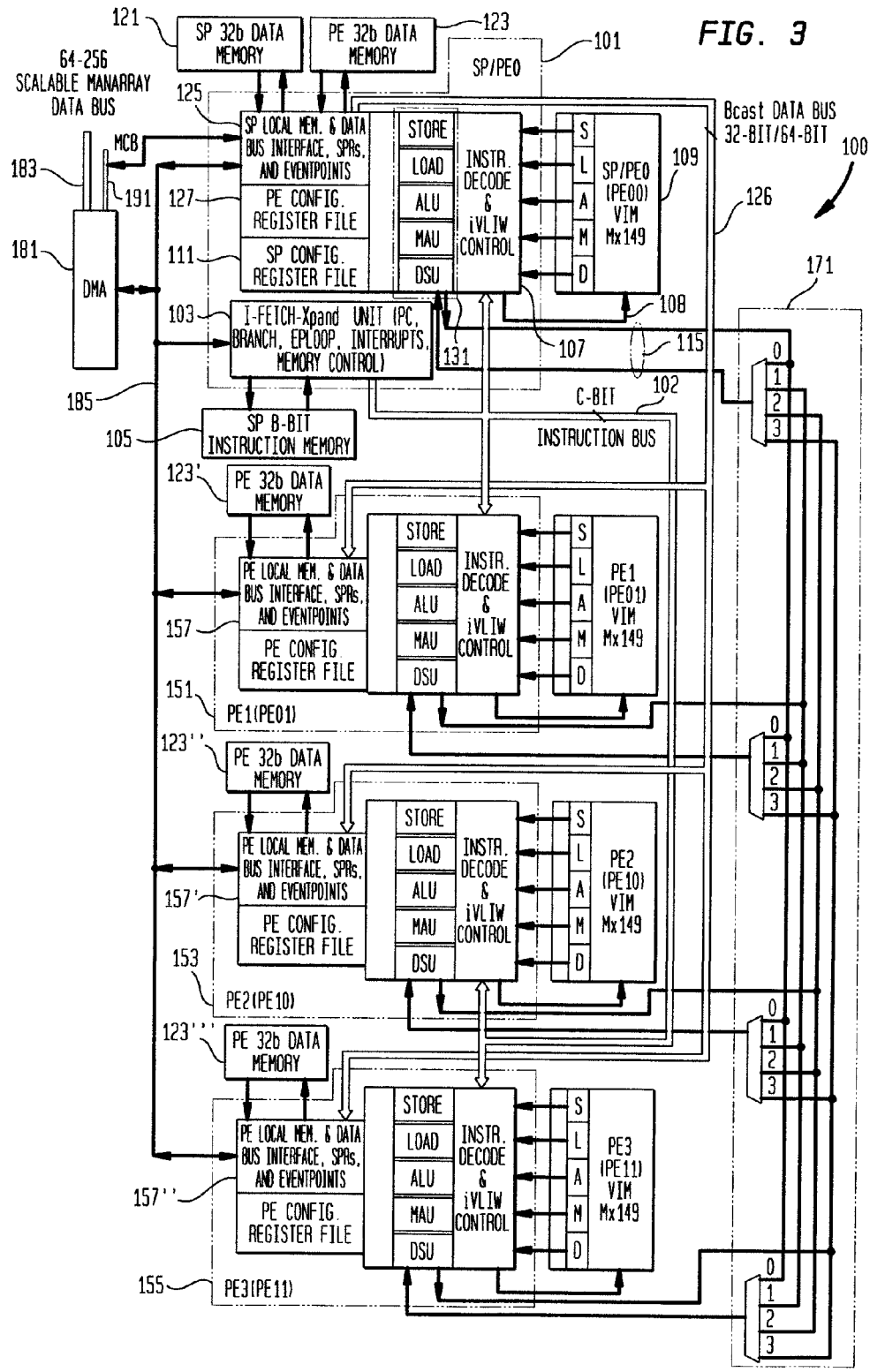
FIG. 3 illustrates a ManArray™ architecture which may suitably be adapted for use in conjunction with the present invention.

The deferred execution architecture of the present invention is generally applicable because it can be implemented logically by adding registers or memory storage for every partition to hold code segments. The storage for these code segments can then be used as an instruction cache memory from which one or more execution units execute instructions when an appropriate explicit execute instruction is encountered. To make the relationship clear, consider a simple example consisting of a processor having a fixed point unit and a floating point unit. Assume that the fixed point unit is a superscalar engine having two ALUs, one Branch, and a Load/Store unit. Further assume that the processor fetches four instructions per cycle. Consider a portion 10 of a program illustrated in FIG. 1 which has a scalar code segment 12, locations i to i+3, and a floating point code segment 14, locations i+4 to i+6.

Clearly, in a typical sequential code execution machine, there is no way to execute instructions from both the code segments 12 and 14 in parallel even though there are available execution units and there are no true dependencies. The basic reason is that the fetching mechanism which is always limited does not allow the decode logic to "see" the floating point code, since only four instructions can be fetched by the processor per cycle in this exemplary architecture.

By restructuring the code 10 of FIG. 1 to segment the scalar and floating point code in segments 22 and 24 and to add execution instructions 26 and 28 to control execution of these segments, respectively, as shown for the restructured code 20 in FIG. 2 and by adding appropriate hardware to execute the new instructions, execution can now proceed as follows. First, the four scalar instructions of code segment 1 22 are fetched and saved to a scalar memory serving as a cache on the execute engine. In addition, the same steps are performed for code segment 2 24 so that the three floating point code instructions are saved to a separate independently accessible storage area in the cache memory. These steps can be achieved in advance by performing the loading of the local cache storage prior to the program execution. Subsequently, the two execute instructions, execute 1 26 and 2 28, will be encountered and cause the parallel execution of both code segments 22 and 24.

For VLIW architectures, the deferred execution architecture is also generally applicable. The traditional approach to VLIW architecture uses a program memory that is the width of the VLIW. To extend this traditional VLIW approach to an array processor would be difficult. In particular, distributing a wide VLIW bus to each PE in an array of PEs is a difficult problem. For example, due to wiring density and wire capacitance, distributing a wide VLIW bus to each PE can limit both size and clock speed of the array processor. The indirect VLIW architecture, distinctly different from the traditional VLIW approach, solves this problem using the basic concept of deferred execution by instantiating local VLIW memories (VIMs) in each PE, loading them appropriately prior to a program's use, and accessing them only when needed by the program by use of an execute VLIW (XV) instruction of the standard short instruction width, for example, 32-bits.

To improve upon this fundamentally advantageous approach what is desired is an array VLIW processor architecture that is greatly extendable with scalable implementations that follow technology advances.

One aspect of the present invention addresses a general form of a modified indirect execution architecture to resolve scalabilty and extendibility problems in a processor design by way of an exemplary implementation using the ManArray architecture adapted as described herein.

In a presently preferred embodiment of the present invention, an exemplary ManArray 2×2 iVLIW single instruction multiple data stream (SIMD) processor 100 shown in FIG. 3 comprises a sequence processor (SP) controller combined with a processing element-0 (PE0) SP/PE0 101, as described in further detail in U.S. Pat. No. 6,219,776. Three additional PEs 151, 153, and 155, are also utilized to demonstrate a number of general extensions to the indirect VLIW architecture for use in a deferred execution processor (DXP) in accordance with the present invention. It is noted that PEs can also be labeled with their matrix positions as shown in parentheses for PE0 (PE00) 101, PE1 (PE01) 151, PE2 (PE10) 153, and PE3 (PE11) 155. The SP/PE0 101 contains the fetch controller 103 to allow the fetching of short instruction words (SIWs) from a 32-bit instruction memory 105. The fetch controller 103 provides the typical functions needed in a programmable processor such as a program counter (PC), branch capability, event point (EP) loop operations, see U.S. patent application Ser. No. 09/598,566 "Methods and Apparatus for Generalized Event Detection and Action Specification in a Processor" filed Jun. 21, 2000 for further details, and support for interrupts. It also provides the instruction memory control which could include an instruction cache if needed by an application. In addition, the SIW I-Fetch controller 103 dispatches 32-bit SIWs to the other PEs in the system by means of the C=32-bit instruction bus 102.

In this exemplary system, common elements are used throughout to simplify the explanation, though actual implementations are not limited to the elements shown. For example, the execution units 131 in the combined SP/PE0 101 can be separated into a set of execution units optimized for the control function, for example, fixed point execution units, and the PE0 as well as the other PEs can be optimized for a floating point application. For the purposes of this description, it is assumed that the execution units 131 are of the same type in the SP/PE0 and the other PEs. In a similar manner, SP/PE0 and the other PEs use a five instruction slot iVLIW architecture which contains a very long instruction word memory (VIM) 109 and an instruction decode and VIM controller function unit 107 which receives instructions as dispatched from the SP/PE0's I-Fetch unit 103 and generates the VIM addresses-and-control signals 108 required to access the iVLIWs stored in VIM. Referenced instruction types are identified by the letters SLAMD in VIM 109, where the letters are matched up with instruction types as follows: Store (S), Load (L), ALU (A), MAU (M), and DSU (D). The basic concept of loading of the iVLIWs is described in greater detail in U.S. Pat. No. 6,151,668. Also contained in the SP/PE0 and the other PEs is a common PE configurable register file 127 which is described in further detail in U.S. Pat. No. 6,343,356.

Due to the combined nature of the SP/PE0, the data memory interface controller 125 must handle the data processing needs of both the SP controller, with SP data in memory 121, and PE0, with PE0 data in memory 123. The SP/PE0 controller 125 also is the controlling point of the data that is sent over the 32-bit broadcast data bus 126. The other PEs, 151, 153, and 155 contain common physical data memory units 123', 123", and 123''' though the data stored in them is generally different as required by the local processing done on each PE. The interface to these PE data memories is also a common design in PEs 1, 2, and 3 and indicated by PE local memory and data bus interface logic 157, 157' and 157". Interconnecting the PEs for data transfer communications is the cluster switch 171 various aspects of which are described in greater detail in U.S. Pat. Nos. 6,023,753, 6,167,501, and 6,167,502.

The interface to a host processor, other peripheral devices, external memory, or the like can be implemented in many ways. For completeness, a primary interface mechanism is contained in a direct memory access (DMA) control unit 181 that provides a scalable ManArray data bus 183 that connects to devices and interface units external to the ManArray core. The DMA control unit 181 provides the data flow and bus arbitration mechanisms needed for these external devices to interface to the ManArray core memories via the multiplexed bus interface symbolically represented by connection 185. A high level view of the ManArray Control Bus (MCB) 191 is also shown in FIG. 3.

In accordance with the present invention, the ManArray architecture is extended to a general form of indirect execute architecture by making the following changes. First, the instructions which make up a VLIW do not have to be stored in executable form in the control processor's program memory, nor do they need to be stored in the program memory at all. If these instructions are not stored in the program memory, then they can be stored in data memory and can be loaded into the VLIW storage by DMA or alternate loading facilities, such as the use of load instructions. Second, the instructions which make up a VLIW do not have to be executable singly in a non-VLIW form. It is noted that by use of the XV enable bits a single instruction from a VLIW line can be executed. See, for example, U.S. Pat. No. 6,173,389. These two changes decouple the instructions that are stored in VLIW memory from the instructions that are stored in the main program storage. This decoupling further implies that the instructions that make up the VLIW do not have to have the same instruction format as those instructions that are stored in program storage. Consequently, opcode fields, register file operand address fields, data type fields, and the like, are not restricted to the limited instruction format size required for those instructions in program memory. Further, there is no requirement that the format size of each slot instruction be identical. A VIM line can be made up of a set of instructions each of a format and length optimized for its execution unit's function. Note that this approach does not preclude having a subset of potentially longer instructions stored in VIM that are essentially in a short instruction format, for example, 32-bits, from singly executing on the PEs.

A further innovation that is described here is a mechanism to load the new variable format instructions into a new VLIW memory, referred to here as a VIM Basket (VIMB). An example using three different size instruction lengths is presented in the following description to illustrate an exemplary implementation of the general form of deferred execution by use of indirect VLIW instructions also referred to as the SLAMDunk1 architecture. First, the present VIM size and VLIW operations are described. Second, the basic VIMB size and VLIW operation when executing these new instructions is described. This discussion is followed by a description of an exemplary mechanism for loading the variable format size instructions into the VIM Basket.

Figure 4A:
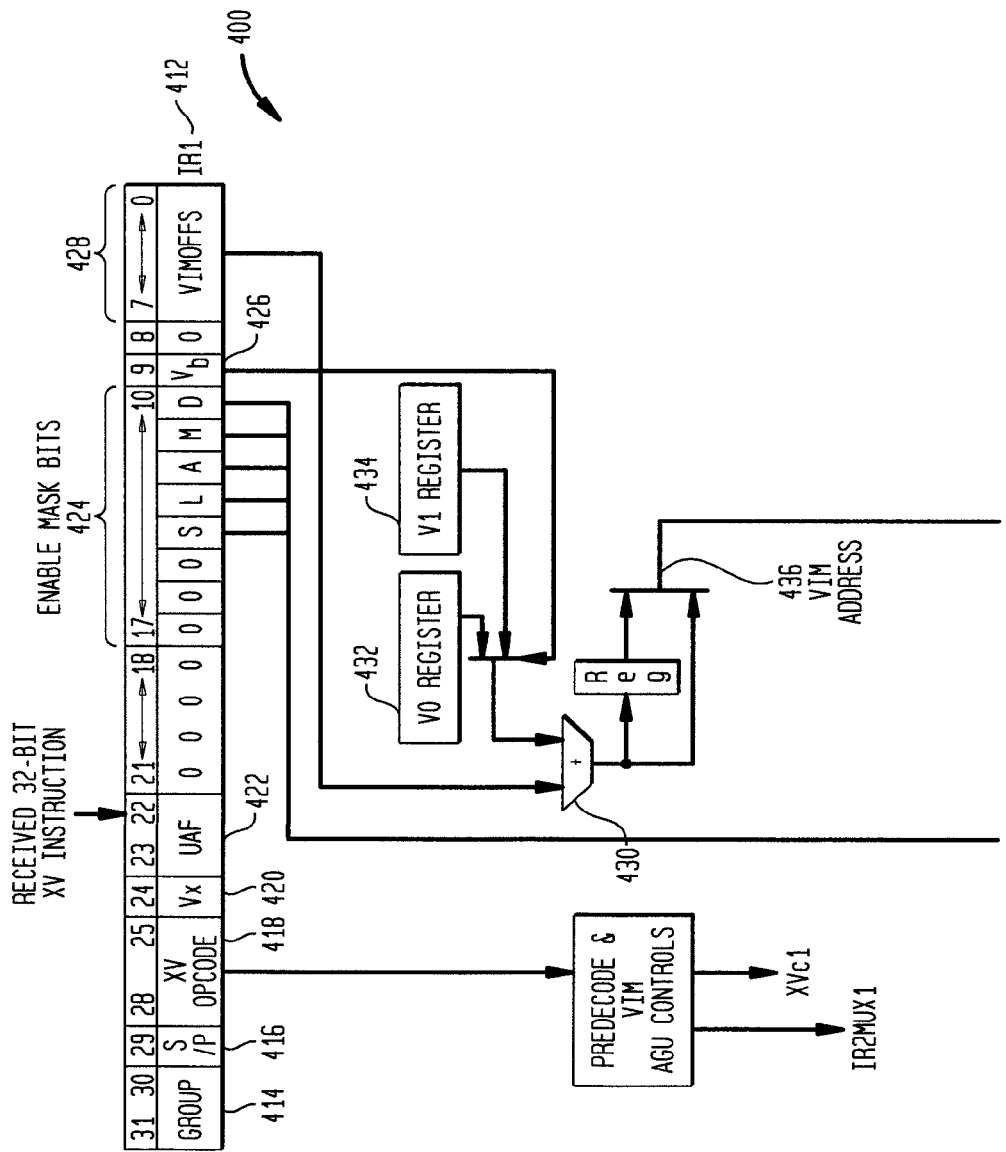
FIG. 4 illustrates a prior art Manta™ VLIW memory (VIM) organization.
Figure 4B:
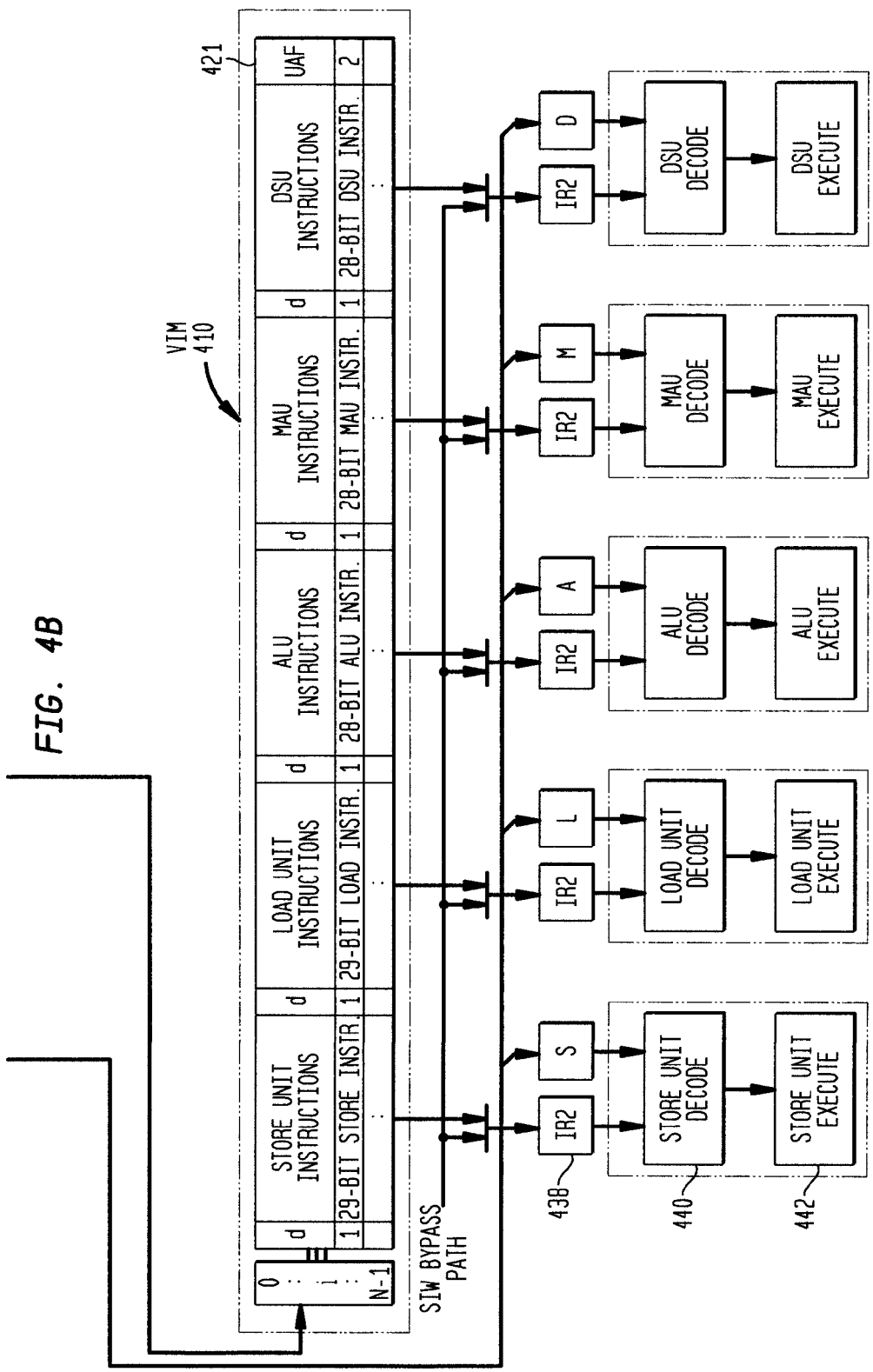

FIG. 4 illustrates a prior art Manta™ VIM organization 400 in which a sequence processor (SP) or processor element (PE) employs a five-instruction slot VLIW Memory (VIM) 410.

Manta is an implementation subset of the ManArray architecture. Each slot in a VLIW in the VIM contains a short instruction word, 32-bits in the case of the present ManArray™ architecture minus the group bits (bits 30 and 31) and a load/store (US) bit for the store and load unit slots (29 bits) and minus the group bits and a 2-bit unit identifier for the ALU, MAU, and DSU (28 bits). In FIG. 4, an instruction register 1 412 (IR1) holds an XV instruction of the format specified by the ManArray architecture. The XV uses a group code 01 414. An S/P bit 416 specifies whether this XV is to be executed in the SP or in the PEs. XV opcode 418 specifically identifies the XV function to the hardware. Vx bit 420 specifies whether to override the load VLIW (LV) set unit affecting flags (UAF) 421. The UAF 422 specifies which arithmetic unit can affect the arithmetic condition flags (ACFs) used by the conditional execution architecture when the Vx bit 420 indicates the override state. Enable mask bits SLAMD 424 specify if a slot in the VLIW is to be executed or not. This feature is useful in software pipeline loop build up and tear down. Vb bit 426 is the VIM base register select bit that selects between V0 or V1 VIM base address registers, and VimOffs field 428 contains a 0-255 offset from the base VIM address register.

Referring to FIG. 4, assume that the VIM 410 has VLIWs already loaded into it. A pipeline flow begins with an instruction fetch cycle which fetches the XV instruction from program memory and distributes it to the SP and PEs. In either the SP or PE, but not both simultaneously as specified by the S/P-bit, the XV instruction is executed. Since the instruction is an XV instruction, the pipeline is expanded to allow the VLIW to be fetched from the VIM. The pipeline is expanded for any VLIW instruction including load VLIW (LV), execute VLIW (XV), or set VLIW (SETV). In brief, the logical operation of an XV instruction as described herein is an indirect fetch of the VLIW stored in the VIM.

In an expanded VIM access cycle which may be referred to as a predecode stage, a VIM address calculation is employed. Adder 430 adds the selected VIM base address register, 432 or 434, with the VIM offset field 428 and this calculated address 436 is used as the VIM address for selecting a VLIW which is read out to instruction register 2 (IR2) 438. The next pipeline stage is a decode stage 440 followed by the execute stage 442 and a condition return cycle completes the pipeline operations for the instruction.

Figure 5A:
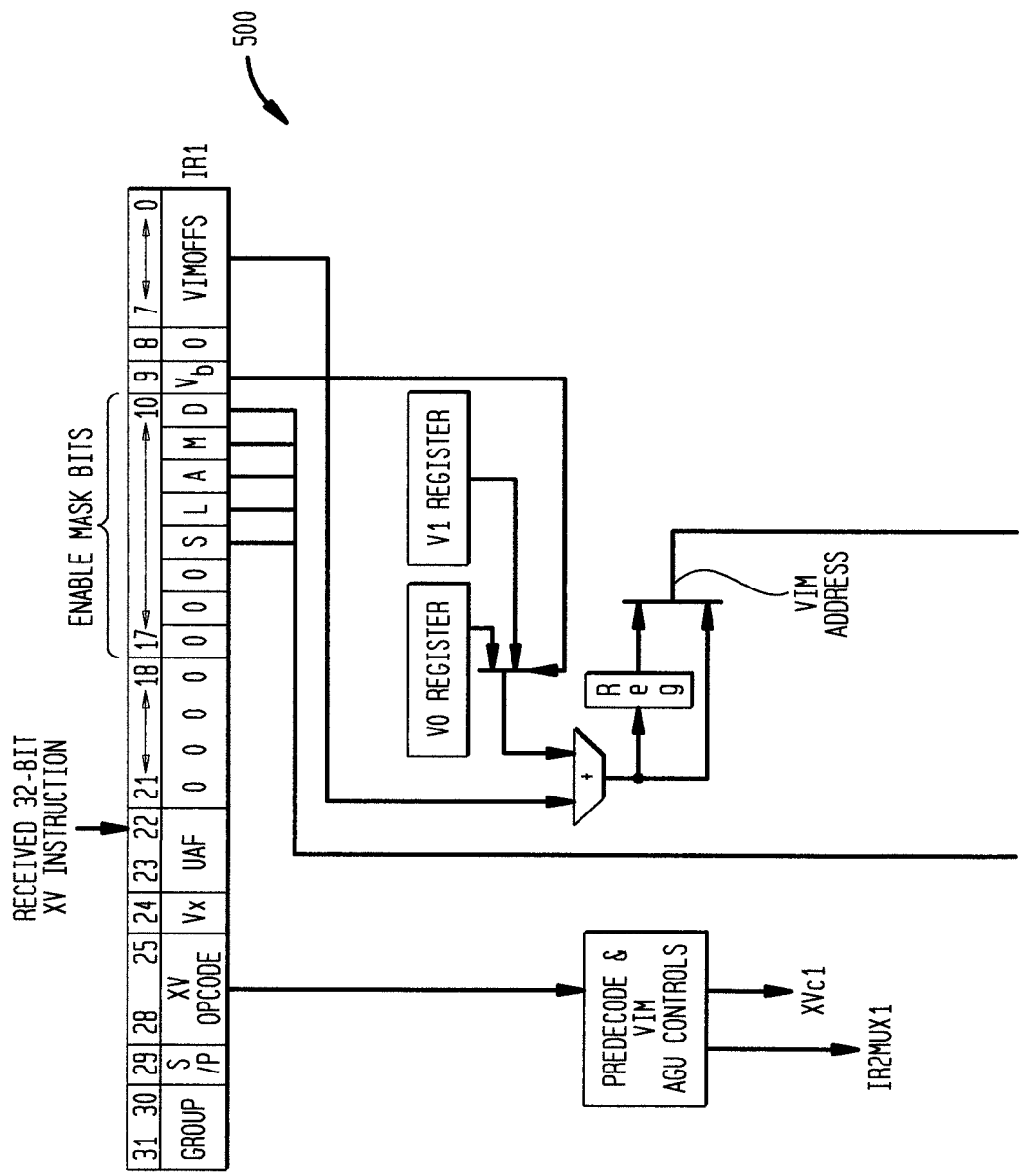
FIG. 5 illustrates a VLIW instruction memory (VIM) basket (VIMB) organization in accordance with the present invention.
Figure 5B:
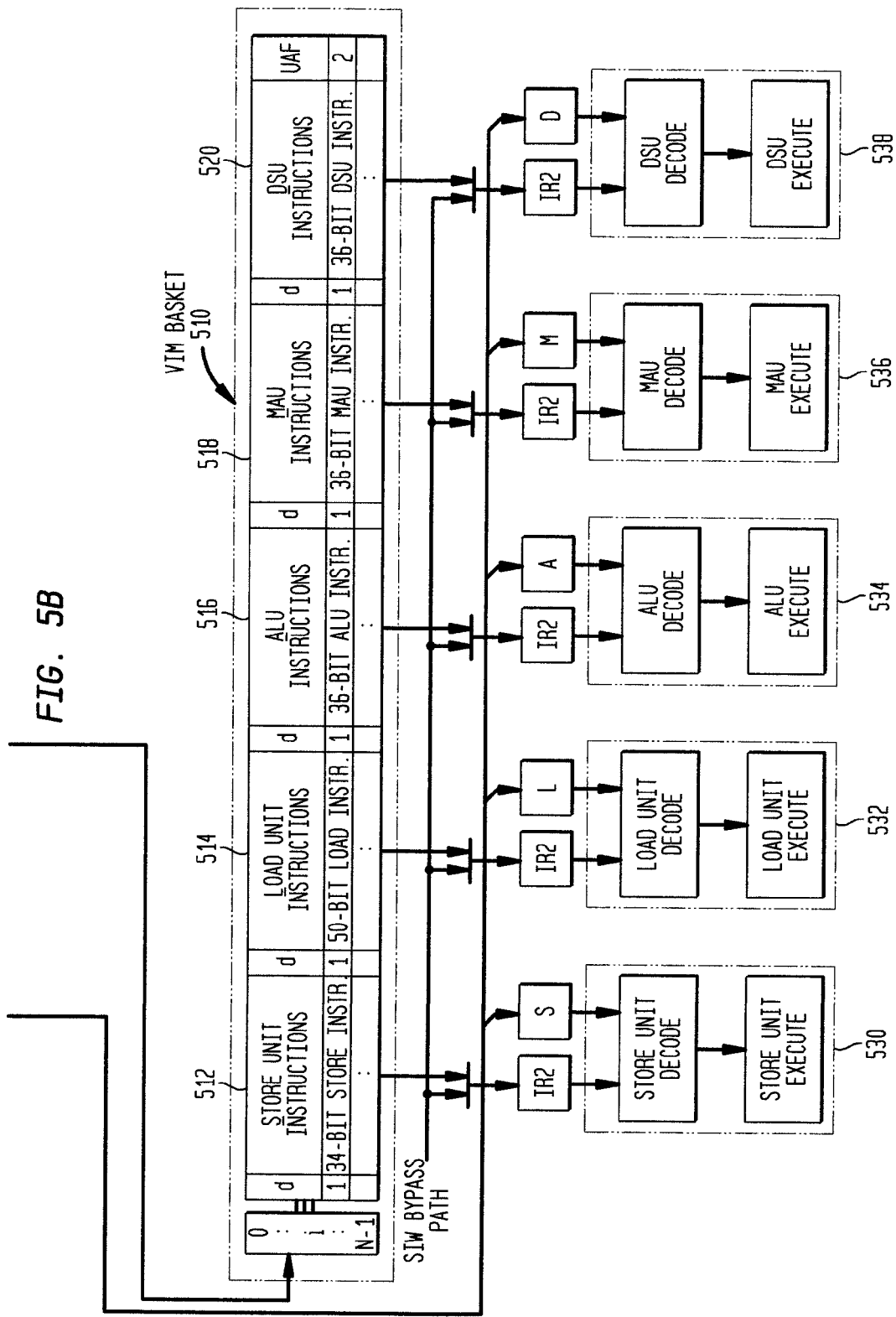

FIG. 5 illustrates a SLAMDunk1 VIMB organization 500 in accordance with the present invention. In this new approach, a new design of the SP or PE 5-slot VIM, a VIM Basket or VIMB 510 is employed. A significant difference to notice between FIG. 4 and FIG. 5 is the instruction width stored in the VIM slots and the VIMB slots. The overall VIM width of FIG. 4, is 149-bits for a five way indirect VLIW ManArray architecture. In the exemplary indirect execution SLAMDunk1 architecture VIM Basket 510 of FIG. 5, a line length of 199-bits is used. The 50 additional bits are distributed among the instruction slots as follows: store unit instruction slots 512 expand by 5-bits, load unit instruction slots 514 expand by 21-bits, and the ALU, MAU, and DSU instruction slots 516, 518 and 520, respectively, expand by 8-bits each. It will be recognized that the number of bits is dependent upon the functionality required in a particular application and implementation. The consequence is that the ManArray architecture is extended such that all instruction fields of the instructions to be stored in a VIMB can be expanded beyond a conformance to a fixed 32-bit instruction format. In general, the instruction set architecture is not limited to any fixed instruction format though an initial set of instructions with fixed formats may be defined for a specific implementation.

In addition, instruction formats smaller than 32-bits can be stored in the VLIW memory slots, as might be useful in a compressed instruction system. In this specific example, these additional VIMB slot bits are designated for use as follows: Store instructions use 2 additional bits to extend the addressing range for the compute register file (CRF) addressing, 1-bit to extend the address register file (ARF) range, 1-bit to expand the opcode field, and 1-bit to extend the conditional field to CE2 format. Load instructions have two formats with the longest for load immediate operations where the additional bits are allocated as follows: 2 additional bits to extend the addressing range for the CRF, 1-bit to extend the ARF range, 1-bit to expand the opcode field, 1-bit to extend the conditional field to CE2 format, and 16-bits to extend the immediate field to 32-bits. The other load instruction format is assumed to be shorter than the 50-bit load immediate format since it does not require the additional 16 immediate bits. ALU, MAU, and DSU instructions use 2 additional bits in each operand field to extend the addressing range for the CRF, 1-bit to expand the opcode field, and 1-bit to extend the data type field.

These instruction extensions allow the CRF to be expanded from the present 32×32-bit/16×64-bit configurable register file size to 128×32-bit/64×64-bit/32×128-bit configurable register file size. It is noted that expansion to larger register files such as 256×32-bits/128/64-bits/64×128-bits/32×256-bits is not precluded and is even anticipated for future architectures. These larger register files can be easily supported by the indirect execution SLAMDunk architecture. The exemplary load unit instruction format allows 32-bit load immediates and a 16 entry ARF instead of the present 8 register ARF. In addition, the opcode fields and arithmetic data type fields have all been expanded as appropriate to allow for more instruction types and to provide support for different data types.

FIG. 6A illustrates a prior art encoding 600 of an MAU SUM2PA instruction in the ManArray architecture. FIG. 6B illustrates an exemplary encoding 610 of an expanded MAU instruction for use in the SLAMDunk1 architecture with two additional bits in each operand field to extend the addressing ranges for the CRF (Rt', Rte', Rx', Rxe', Ry', and Rye'), one bit to expand the opcode field (MAUopcode'), and one bit to expand the data type field (SumpExt'). FIG. 6C shows a mapping 620 illustrating how the expanded SLAMDunk1 MAU instruction of FIG. 6B, is a super set of the present ManArray encoding of an MAU SUM2PA instruction. In the 32-bit mapping to SLAMDunk1 40-bit encoding, the extended instruction fields are encoded to a "0" value preserving the present opcodes, register file addressing ranges and existing data types. It is further noted that in FIG. 6B the Group 612 and Unit 614 fields are not required to be stored in the VIMB requiring only 36-bits of the 40-bit encoding as shown for MAU instruction slot 518 in FIG. 5.

Figure 7A:
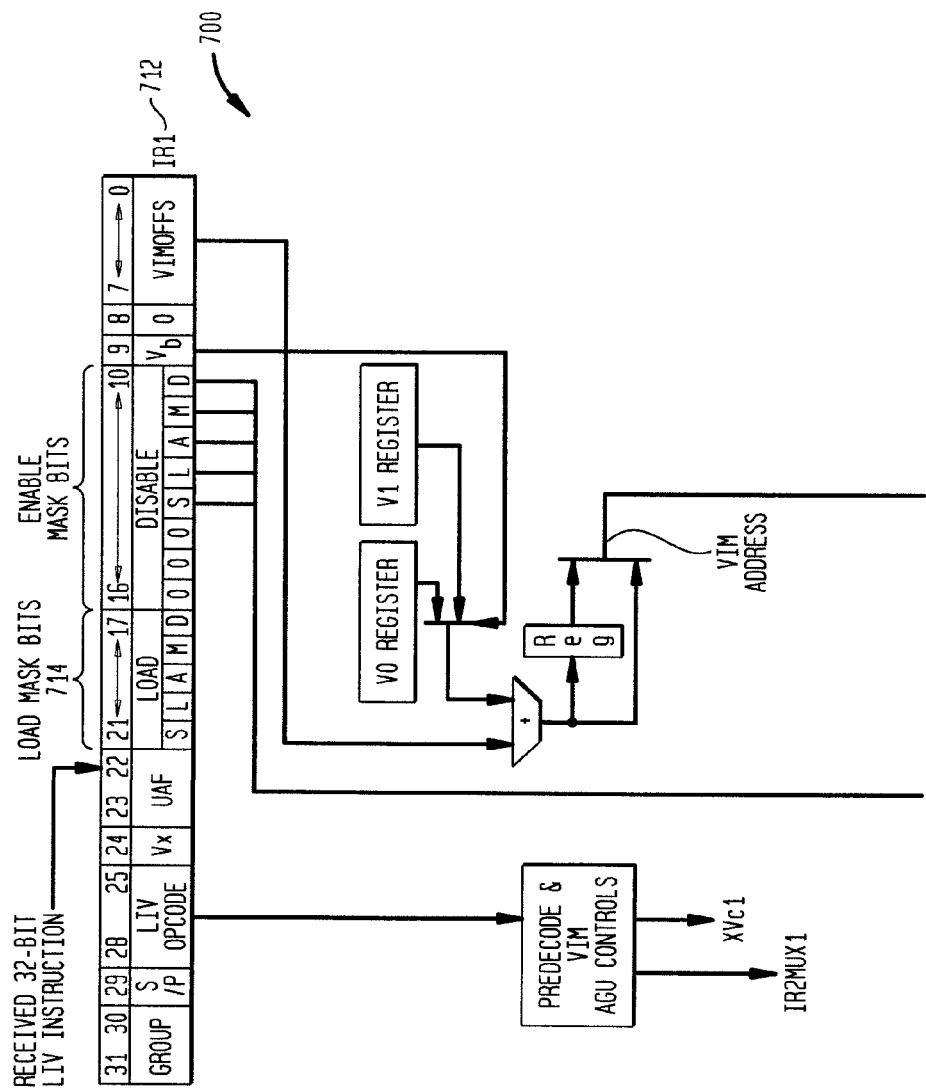
FIG. 7 illustrates a load VIMB organization in accordance with the present invention.
Figure 7B:
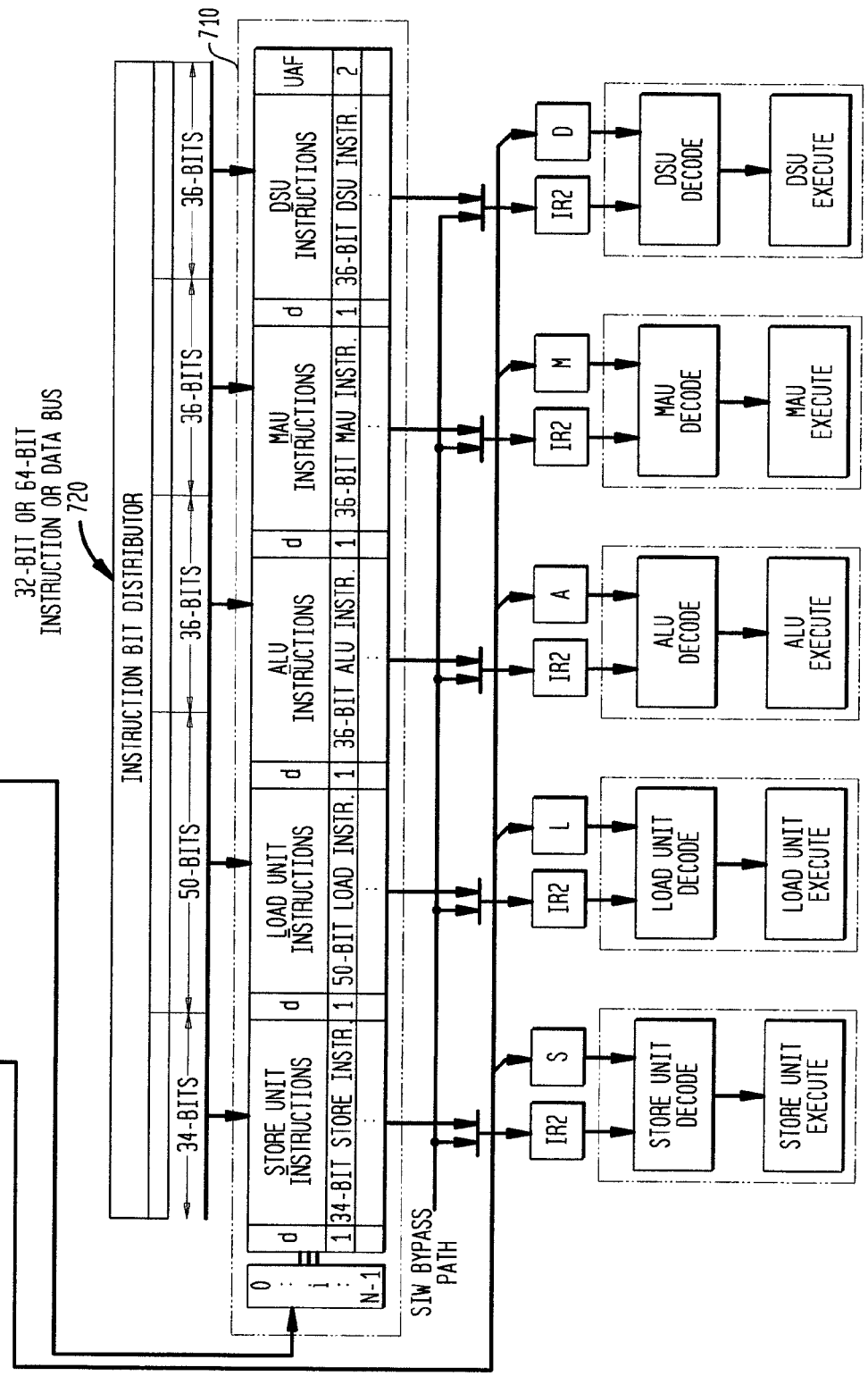

FIG. 7 illustrates an exemplary SLAMDunk1 load VIM Basket apparatus 700 for loading a VIM Basket 710. The basic idea in the exemplary embodiment of FIG. 7 is to treat the instructions to be loaded into VIMB 710 as data constants which are encoded in 32-bits or 64-bits, depending upon the data path width associated with loading the VIM Basket. Note that 128-bit load data paths and other data widths are not precluded by this discussion and may be readily implemented. For the 199-bit VIMB example illustrated in FIG. 7, 192-bits represent the instruction data to be loaded with the disable (d) and UAF bits obtained from the LV instruction accounting for the additional 7-bits. The 192-bits can be obtained through six 32-bit or three 64-bit load operations. Alternatively, the VIMB 710 can be loaded through a background DMA operation or the use of load instructions similar to the approaches outlined in U.S. patent application Ser. No. 09/747,056 entitled "Methods and Apparatus for Loading a Very Long Instruction Word Memory" and filed Dec. 22, 2000.

In FIG. 7, a load iVLIW (LIV) instruction is received into IR1. The LIV instruction contains a new load mask bit field 714, bits 17-21. This field 714 specifies which slots are to be loaded into the VIM Basket. If a count of the number of instructions to be loaded into the VIMB is necessary for an implementation, a simple 5-bit field bit hardware counter, counting the number of is in bit field 17-21, can be used to calculate the number of instructions to be loaded. By definition, the instructions are specified in a Store, Load, ALU, MAU, DSU (SLAMD) loading order so that with the load mask bits, bits 17-21, a specified fixed loading order, and known slot instruction sizes in a specific implementation, an instruction bit distributor 720 as shown in FIG. 7 can organize the bits in the proper order for loading into the VIMB 710. Note that with 64-bit load capability and use of the LIV instruction, it is possible to reduce the latency of loading the VIM Basket even with the increased 192-bit requirement over the Manta VIM load latency. For example, VIMB loading of 1 slot would take 2 cycles—the same as Manta, 2 slots would take 3-cycles—the same as Manta, 3 slots would take 3-cycles—one less than on Manta, 4 slots would take 4-cycles—one less than on Manta, 5 slots would take 4-cycles—two less than on Manta.

Figure 8A:
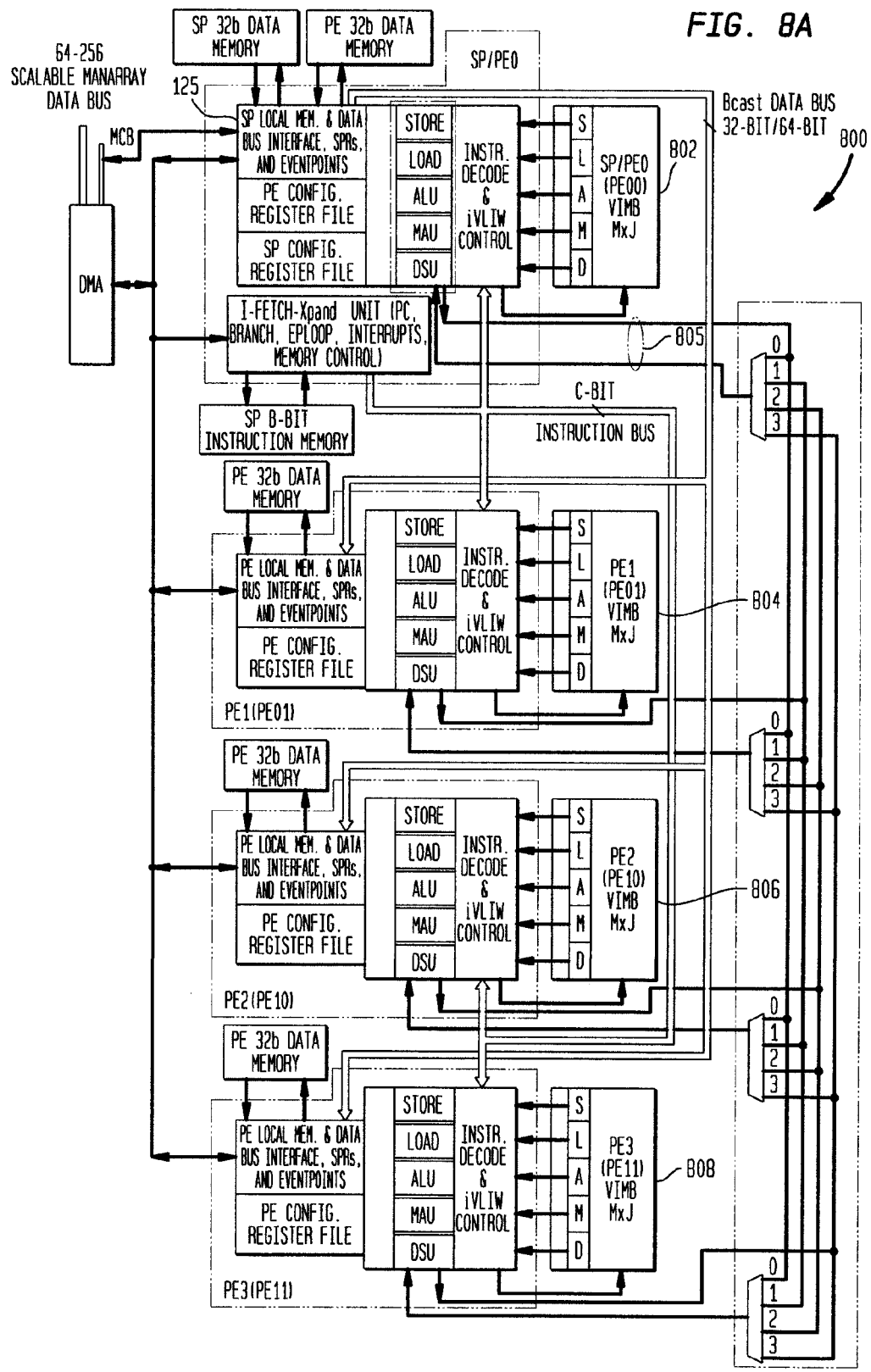
FIG. 8A illustrates a 2×2 ManArray™ indirect VLIW (iVLIW) processor adapted to include an M×J VIMB in accordance with the present invention.

FIG. 8A shows an updated version 800 of the 2×2 processor of FIG. 3 showing the updated VIMB 802, 804, 806 and 808 made up of M lines of J-bits each, for example, J=199-bits as discussed in connection with FIGS. 5 and 7 above.

The first example using the SLAMDunk1 architecture was discussed above in the context of various aspects of Manta and Mobile Media Processor (MMP) a low power processor subset of the ManArray architecture. It is now shown how the ManArray architecture can be further extended using the principles of deferred execution architecture. The goals underlying this version of architecture is to provide a simpler design with less area, one which could achieve higher performance in a standard ASIC flow process while still using the present Manta style pipeline, potential to reduce power below MMP specifications, and potentially to improve the programming model to facilitate easier programming.

In Manta, the MMP, and the SLAMDunk1 processors the SP was merged with PE0 as specified in U.S. Pat. No. 6,219,776, primarily for implementation cost reasons. In the SLAMDunk2 or DXP2 architecture the SP is separated from the PEs since depending upon the application, the processing requirements of the SP will vary greatly from that of the PEs. With a split arrangement, the SP can be more easily optimized for its function. For example, this optimization can include the execution units which can be a greatly reduced subset of the execution units used in the PEs and the VIM Basket (VIMB), a VLIW storage unit, in the SP can be sized according to its needs independent of the PEs. This separation does not isolate the SP which can still be directly connected to the ManArray network as will be discussed in greater detail below.

Figure 8B:
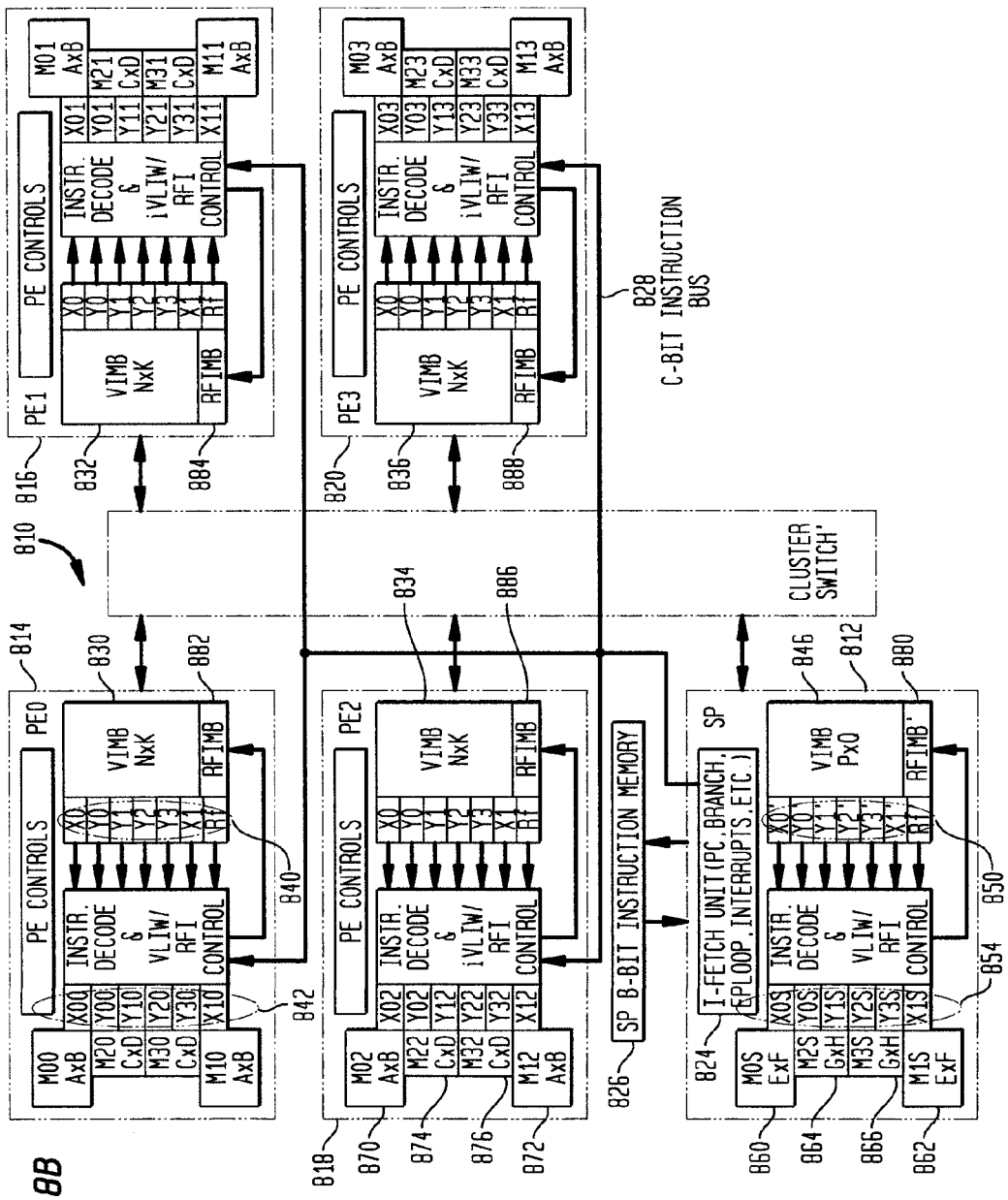
FIG. 8B illustrates a 2×2 deferred execution processor 2 (DXP2) utilizing six execution units and a memory centric VLIW architecture in accordance with the present invention.

FIG. 8B illustrates a DXP2 2×2 processor core 810 using a separate SP 812 and four PEs, PE0 814, PE1 816, PE2 818 and PE3 820. The SP 812 contains an Ifetch unit 824 comprising a program counter PC representing the instruction sequencing from the instruction memory 826, branch, event point loop (Eploop) facilities, interrupts, and the like. A C-bit instruction bus 828 distributes XV type instructions that are fetched under control of SP 812 from the SP's instruction memory 826 and distributed to an instruction register in each of the PEs. The VIMB for the PEs 830-836 are each of size N×K bits to store the expanded instructions X0, Y0, Y1, Y2, Y3 and X1 840 that are executed on the six function execution units X0$i$, Y0$i$, Y1$i$, Y2$i$, Y3$i$ and X1$i$ for example for PE0 execution units 842. The SP's VIMB 846 of size P×Q bits can be optimized and of different size than the PEs' VIMBs. The SP's VIMB stores expanded instructions X0', Y0', Y1', Y2', Y3' and X1' 850 that are executed on the six functions execution units X0S, Y0S, Y1S, Y2S, Y3S and X1S 854 which can be a different set of functions than that used on the PEs. The memory organization for the DXP2 processor is different than the SLAMDunk1 processor shown in FIG. 8A and will be discussed in greater depth with discussion of the execution data path of FIG. 14. It is noted now though that the SP data memories M0S 860 and M1S 862 of E×F bits can be of different size than the PE data memories, for example PE2's M02 870 and M12 872 of A×B bits. The other SP data memories M2S 864 and M3S 866 of G×H bits can be of different size than the PE data memories, for example PE2's M22 874 and M32 876 of C×D bits.

Figure 9A:
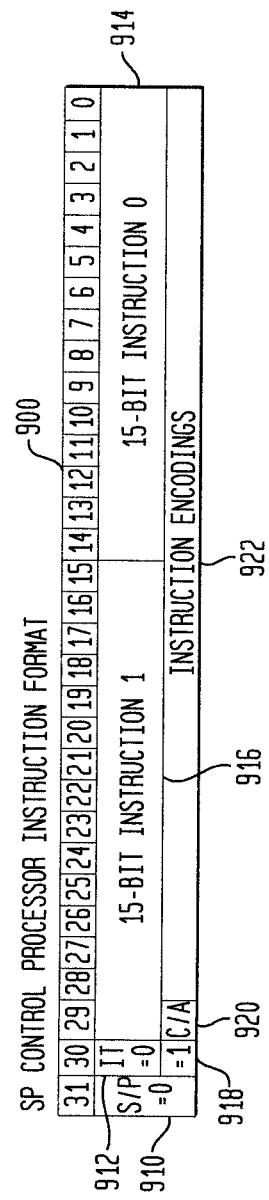
FIGS. 9A and 9B illustrate an SP control processor instruction format and a PE instruction format to be used in a deferred execution processor according to the present invention.
Figure 9B:
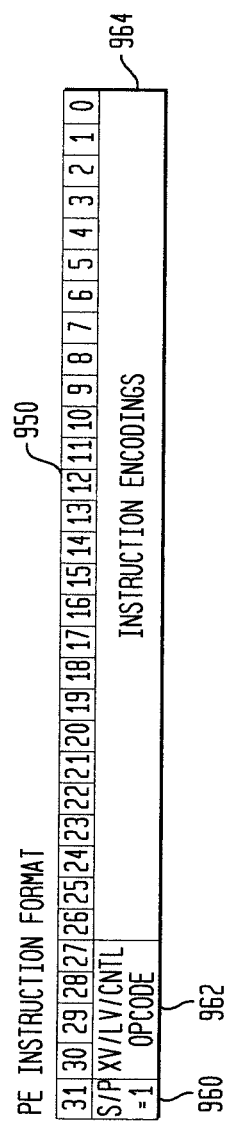

Another attribute of the DXP2 architecture is the removal of the Load and Store units due to the expanded instruction format allowed by DXP2 instructions stored in the VIMB thereby supporting a memory centric design. To distinguish between SP instructions and PE instructions an S/P bit is used. Even though other approaches are possible and maybe even desirable depending upon an application's requirements, the SP is assumed to be a memory centric VLIW processor that uses two instruction formats and two major groupings of instruction types. A control type and an arithmetic instruction type are specified to be encoded in either or both 15-bit and 32-bit SP instruction formats. FIG. 9A illustrates an exemplary basic format 900 with S/P bit-31 910 set equal to 0 indicating the instruction is an SP control processor instruction. The next bit, It bit-30 912, is set to a 0 indicating dual 15-bit instructions, 914 and 916, are stored in the 30-bit field hits 29-0. For a description of an exemplary 15-bit instruction format see prior U.S. Pat. Nos. 6,101,592 and 6,321,322. For 32-bit SP instructions, the It bit is set to a 1 918. Control or arithmetic (C/A) specifying bit 920 indicates whether the instruction encoding 922 defines control functions, such as branches, or arithmetic functions. Alternatively, the C/A bit decoding split may be embedded within an opcode field of the instruction encoding depending upon the instruction set requirements. The instruction format 950 in FIG. 9B is the DXP2 PE instruction format, SP bit 960=1, with the majority of DXP2 PE instructions being defined to be XV or LV indirect VLIW instructions, as indicated by the PE instruction opcode field 962 and instruction encodings 964. Also supported by the PE instruction format 950 are control function instructions, such as event point looping setup instructions.

It is further noted that by having the SP separate from the PEs it is possible to support a processor organization where a group of instructions can be prefetched from the SP's instruction memory and then split according to the S/P bit for concurrent execution of SP and PE instructions, if no data dependencies or program sequence violations preclude such operation.

The exemplary DXP2 indirect VLIW architecture uses a single VIMB to support two local data memory units and six execution units in each PE. The six execution units can be controlled as six execution units in one instruction execution sequence or as four execution units in a second instruction execution sequence. The configuration of the execution units can change cycle by cycle, dependent upon the instructions in the pipeline. The four execution unit operating configuration provides additional operand addressing range to support directly addressing the local PE data memories. From an architectural perspective, FIG. 10A illustrates two encoding formats 1000 of XVs, XV1 and XV2. For the XV1 format, a unique opcode 1002, specifies a four-slot VLIW for the four execution units configuration requiring four enable bits E0-E3 1004. The XV2 format is defined by a unique opcode 1003, which specifies a six-slot VLIW for the six execution units configuration requiring six enable bits E0-E5 1006. Both XV1 and XV2 use a $V_b$ bit 1008 to select one of two VIMB base registers for address calculations. The VIMB address calculation adds a 9-bit VIM Basket offset (VIMBoffs) 1010 to the selected VIMB base register to create the address of the desired VLIW in the VIM Basket. A further aspect of the DXP2 architecture is the use of a vector style of operation termed register file indexing RFI. The RFI operation is controlled by internal control bits which are stored in a separate memory unit that is addressed by adding a 6-bit RFI Memory offset (RFIMoffs) 1012 to a RFI Memory base register selected by $R_b$ 1014. The separate memory units are located in the SP as the RFI memory basket (RFIMB') 880 and RFIMB 882, 884, 886 and 888 in each PE. Unit affecting field (UAF) 1020 is used instead of the UAF bits stored in the VIM Basket if the override Vx bit 1022 is set active. The RFI operation and the special execution unit operation are described in further detail below. FIG. 10B illustrates two XV formats 1050, XV3 and XV4, each uniquely defined in opcode field bits 30-27 1052, which are similar to XV1 and XV2 except that no RFI operation is specified thereby creating a reserved field 1054. The reserved field 1054 can be utilized for future expansion, such as expanding the VIMBasket offset field or specifying translation bits as was done in prior U.S. Pat. Nos. 6,101,592 and 6,321,322.

To control the loading of the expanded instructions from the local PE data memories into the VIM Basket requires new forms of the Load VLIW (LV) instruction. Two exemplary LV instructions are shown in encoding format 1100 of FIG. 11A. The two types of LVs are a 4-slot LV1 and a 6-slot LV2 as specified by the opcode 1115 and 1116. For the LV1, four enable bits E0-E3 1120 are required to specify which slots are to be loaded into the VIM Basket. For the LV2, six enable bits E0-E5 are required to specify which slots are to be loaded into the VIM Basket. Two address generation fields are specified in both LVs. The first uses 10-bit Memory offset (MEMoffs) field 1104 and adds it to the contents of a selected memory base register ($M_b$) 1106 to create a data memory address. In the exemplary implementation, there are two local PE data memories as will be further described below and VLIWs can be stored in either memory. To select which memory to load the VIM Basket from, the $M_b$ bit 1106 is used to select a first memory and a first memory base register when Mb is 0 and to select a second memory and a second memory base register when $M_b$ is specified as a 1. A second address generation field is specified with a 9-bit VIM Basket offset (VIMBoffs) 1110 which is added to the contents of a selected VIM base register ($V_b$) 1112 to create the VIMB address.

Two further LVs 1140 LV3 1141 and LV4 1142 shown in FIG. 11B are used to specify the loading of the RFI memory for four slot VLIWs and six slot VLIWs, respectively. To accomplish this function, two address generation fields are specified. The first uses 10-bit MEMoffs field 1144 and $M_b$, base address register select bit 1146 as described in the LV1 and LV2 discussion above to create a data memory address. The address generation for the RFI memory takes a 6-bit RFIMemory value 1150 adds it to the contents of a selected Rb 1152 base register to create the RFIMemory address. The r bits 1154 represent further control information that can be loaded into the addressed RFIMemory location. The final LV instructions 1170 are the LV5 and LV6 used to load various parameters such as UAF 1172, disable bit parameters 1174, D0-D3 for LV5 and D0-D5 for LV6, and tags t 1176 at a VIMB address generated by adding the 9-bit VIMBoffs 1180 to the contents of a selected $V_b$ 1182 base register.

Figure 12B:
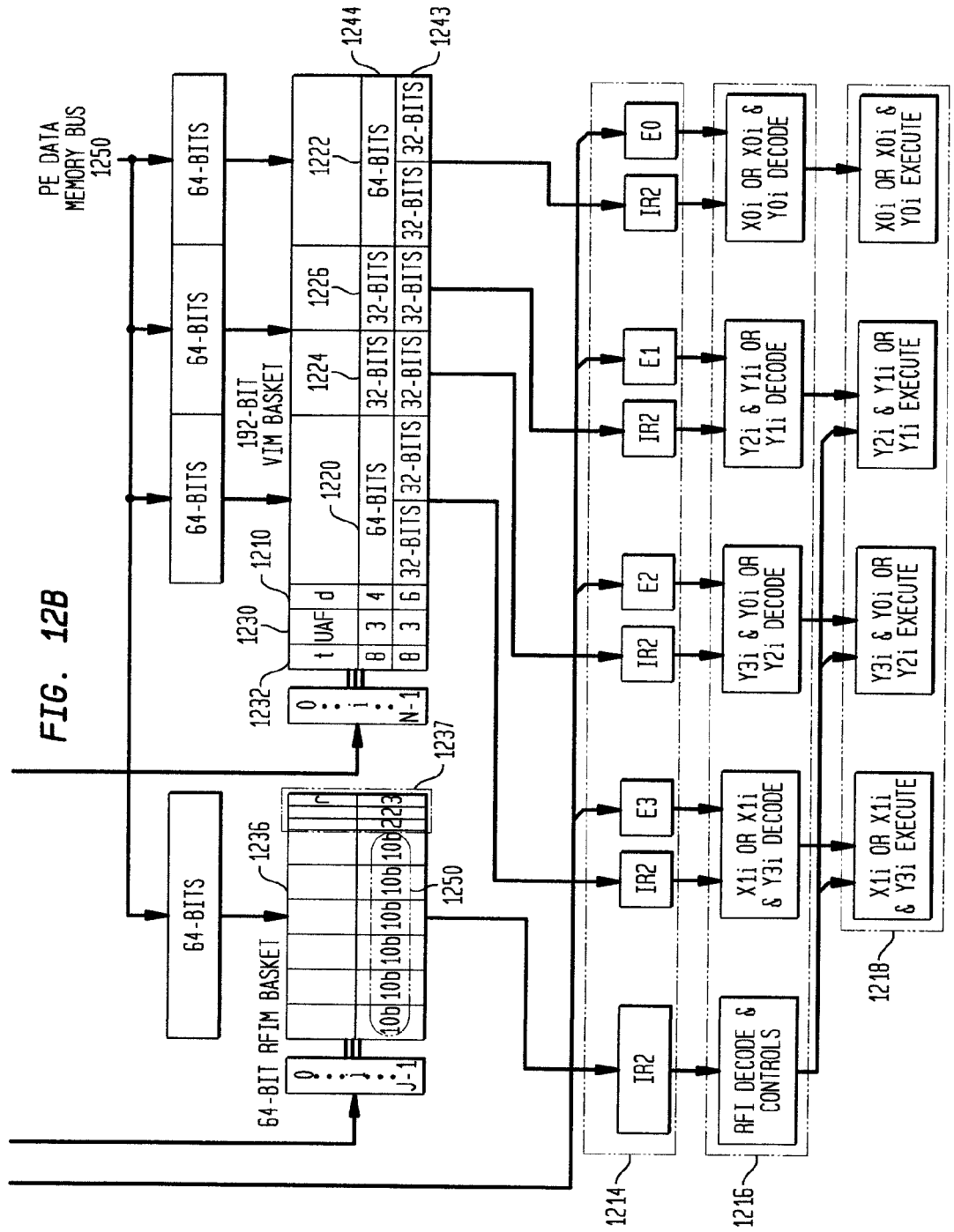
FIG. 12 illustrates a DXP2 processor element organization in accordance with the present invention.

FIG. 12 illustrates aspects of a DXP2 processor including a VIM Basket 1210, local instruction registers IR1 1212 and IR2 1214, and decode 1216 and execution 1218 stages in a PE. Some of the differences between the FIG. 12 organization and the SLAMDunk1 organization shown in FIG. 5 are as follows: The VIMBasket 1210 consists of either four slots 1243 or six slots 1244 in FIG. 12 instead of the fixed five slot arrangement in FIG. 5. Two instruction widths are supported in the DXP2 of FIG. 12, a 64-bit instruction type and a 32-bit instruction type, for example 1220 and 1222 are 64-bit instructions and 1224 and 1226 are 32-bit instructions. A 3-bit UAF field 1230 is used to support the six execution units. A new tag field t 1232 is specified for future use. A second memory 1236 for RFI control parameter storage may be accessed in parallel with a VIMBasket 1210 access. No Short Instruction Word (SIW) path bypassing the VIMB is used in the DXP2 since this capability can be obtained through use of the XV's enable bits.

Figure 13:
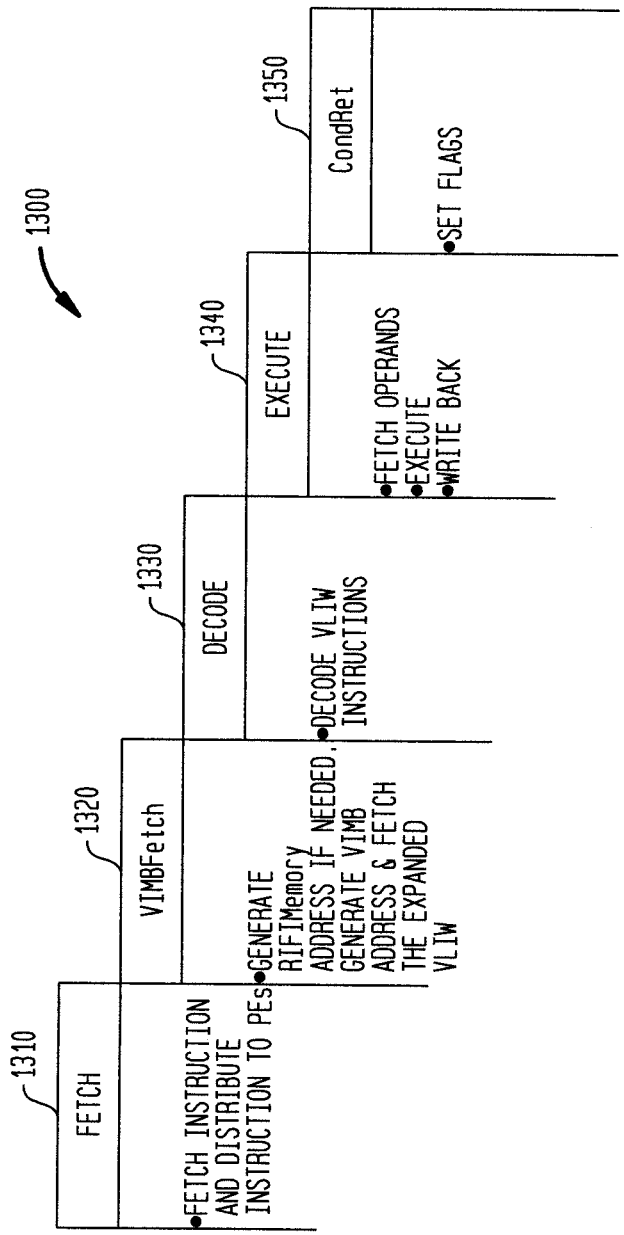
FIG. 13 illustrates the DXP2 processor pipeline.

A five stage pipeline 1300 shown in FIG. 13 is used to describe the operation sequence of the DXP2 processor with references to FIG. 12. In the DXP2 processor, in a first pipe stage 1310, an instruction fetch stage, the SP fetches an instruction and distributes it via an instruction bus path 1238 to the PEs to be received into instruction register 1 (IR1) 1212. To illustrate a VLIW operation an XV1 instruction is received in the PEs IRl. In the next pipe stage 1320, a VIMB fetch stage, a VIMBFetch operation is defined to start by generating the RFIMemory address through the address adder circuitry 1240 and the VIMBasket address through the address adder circuitry 1242. Both the RFIMemory 1236 and the VIM Basket 1210 are accessed selecting the desired RFI control parameters and the desired expanded VLIW. For the XV1 case, an exemplary VLIW is shown in line 1244 consisting of the two 64-bit instructions 1220 and 1222 and the two 32-bit instructions 1224 and 1226. The accessed values along with the appropriate enable bits E3-E0, are latched in the instruction register 2 (IR2) 1214 at the end of the VIMBFetch stage 1320. The UAF logic and the memory access controls are not shown for clarity in describing the basic operating principles of the DXP2 architecture.

The next pipeline stage 1330 is a decode stage which corresponds to the dashed outlined section 1216 in FIG. 12. The execution unit controls are set up during the decode stage. Based upon the XV type, the 4-slot or 6-slot configuration is determined as early as the VIMBFetch stage 1320 or by the Decode stage 1330. The next pipeline stage 1340 is an Execute stage in which the operands are fetched, the operation is executed and the results written back as specified in the instruction. This pipeline stage does not require any operand bypass controls or data bypass paths as all actions are specified to occur in the single execute stage.

Though multistage execution units and deeper pipelines with bypass circuitry are not precluded by the DXP architecture in general, the exemplary DXP2 processor described in the present invention defines only single stage execute atomic-operation instructions. One of the reasons behind this approach is compiler simplicity and general programming simplicity. The pipeline is completed with a final stage 1350, a Condition Return (CondRet) stage. In this stage, operation flags are set. For purposes of clarity of description and illustration; this logic and paths are not shown in FIG. 12. The pipeline shown in FIG. 13 is a fixed pipe but based on the dynamic expanding Manta pipeline that is described in further detail in U.S. Pat. No. 6,216,223. The path to load the VIMB 1210 and the RFIM 1236 is from a PE Data Memory Bus 1250 which in the exemplary implementation is a multiplexed bus path from the two local PE data memories.

Figure 14:
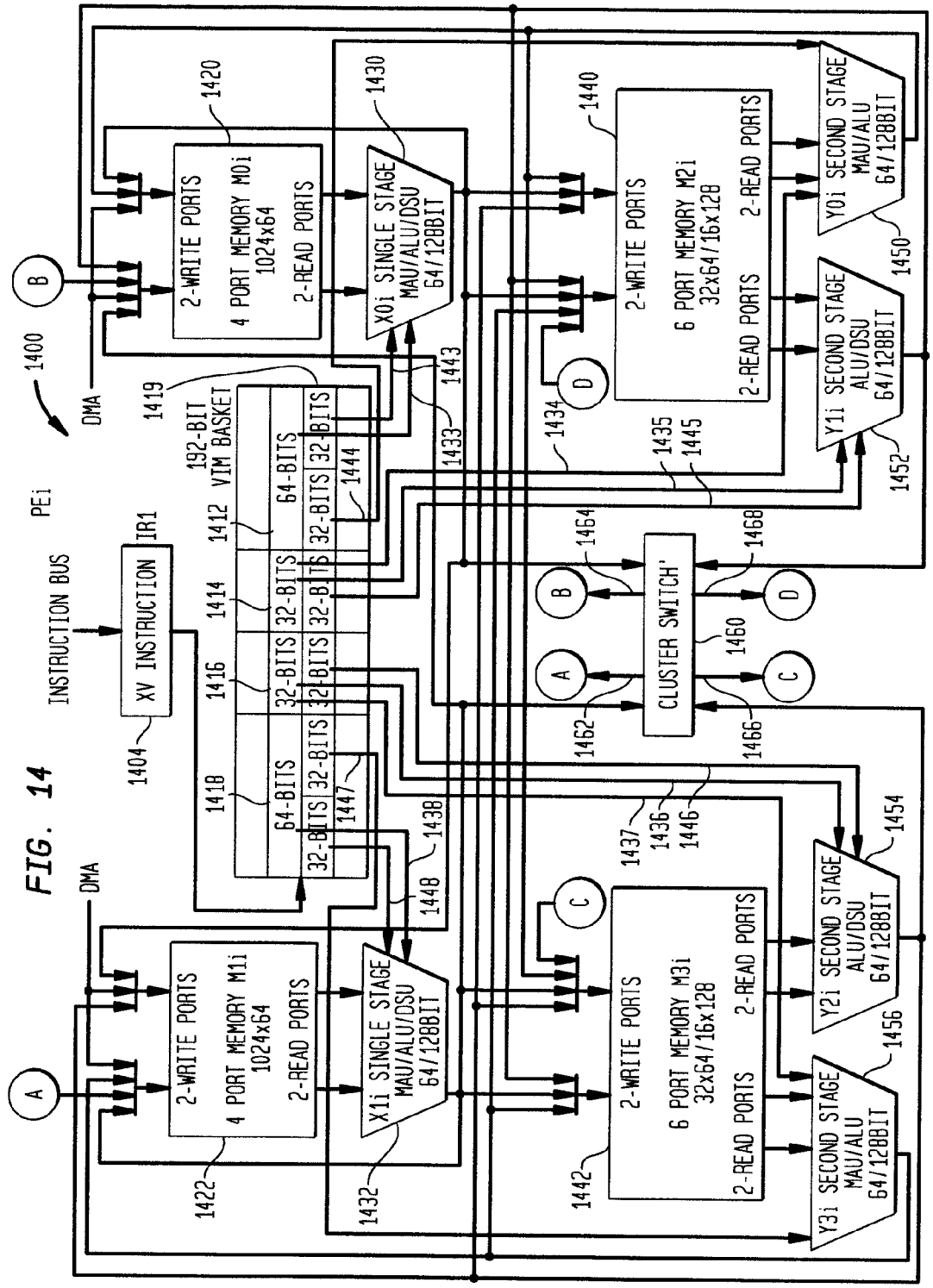
FIG. 14 illustrates the memory and execution unit organization used in the DXP2 processor in accordance with the present invention.

FIG. 14 is a high level view of a PEi data path 1400 which is made up of a single IR1 register 1404, a single VIM Basket 1410, two local PE data memories M0i 1420 and M1i 1422, two single stage execution units X0i 1430 and X1i 1432, two staging register files M2i 1440 and M3i 1442, four single stage execution units Y0i 1450, Y1i 1452, Y2i 1454, and Y3i 1456, and a cluster switch 1460. The RFI memory and numerous control signals are not shown for clarity of describing a basic data flow path as used in the PEs. In the SLAMDunk1 design, the processor is a load/store register file design as shown in FIG. 5 with Store Decode and Execute Units 530, Load Decode and Execute Units 532, and three arithmetic/logic/PESwitch Units 534, 536, and 538. In FIG. 14, the PEi data path has no Load or Store units and all six execution units are of the arithmetic/logic/PESwitch classification. This arrangement simplifies the design by not requiring separate load and store address registers and address generation logic. The single stage execution units X0i 1430 and X1i 1432 access their source operands directly from the local memories M0i 1420 and M1i 1422, respectively. This gives the DXP2 the effective load bandwidth of four load units as compared to the earlier SLAMDunk1 design which is supported by a single load unit. The arrowed lines emanating from the VIM Basket indicate lines of control based upon decoded instructions from the VIMB to the execution units depending upon whether a 4-slot VLIW is accessed or a 6-slot VLIW is accessed. The bolder lines emanate from a 4-slot VLIW and indicate that the rightmost 64-bit slot 1412 decoded generates control signal lines 1433 controlling execution unit X0i 1430, the next slot, a 32-bit instruction 1414 decoded generates control signal lines 1434 and 1435 controlling execution units Y0i 1450 and Y1i 1452, the next slot, a 32-bit instruction 1416 decoded generates control signal lines 1436 and 1437 controlling execution units Y2i 1454 and Y3i 1456, the next slot, a 64-bit instruction 1418 decoded generates control signal lines 1438 controlling execution unit X1i 1432. It will be appreciated that other control configurations of the six execution units are possible depending upon an application's needs. The finer lines emanate from a 6-slot VLIW made up of all 32-bit instructions where beginning at the rightmost 32-bit slot 1419 decoded generates control signal lines 1443 controlling execution unit X0i 1430, the next 32-bit slot decoded generates control signal lines 1444 controlling execution unit Y0i 1450, the next 32-bit slot decoded generates control signal lines 1445 controlling execution unit Y1i 1452, the next 32-bit slot decoded generates control signal lines 1446 controlling execution unit Y2i 1454, the next 32-bit slot decoded generates control signal lines 1447 controlling execution unit Y3i 1456, and the last 32-bit slot decoded generates control signal lines 1448 controlling execution unit X1i 1432. It will also be appreciated for the 6-slot VLIW that other control configurations are possible depending upon an application's needs. The execution units Y0i 1450-Y3i 1456 are single stage execution units which access their operands from the staging memories M2i 1440 and M3i 1442 providing 8 ports of data bandwidth for this purpose.

The execution results of the first stage execution units X0i 1430 and X1i 1432 can be directed to either memory M0i 1420 or M1i 1422 or the memories M2i 1440 or M3i 1442 individually or in combination as specified by the architecture. The execution results of the second stage execution units Y0i 1450, Y1i 1452, Y2i 1454 and Y3i 1456 can directed to selected memories as specified by the architecture. FIG. 14 illustrates one of a number of possible connection paths for the execution units. It is also possible for the DXP2 architecture to define connection paths to the ManArray network from each memory through an execution path, as shown in FIG. 14 with cluster switch 1460. This execution path is similar to the DSU to cluster switch path and multiple I/O paths 115 and 805, shown in FIG. 3 and FIG. 8A, respectively. Depending upon the application needs, the number of these paths can be minimized in each PE, for example to a single path or to a choice of two paths. Depending upon this decision, the PEi output path to the network may be a single path or multiple paths. It is also noted that the input path from the cluster switch 1460 to the memories may be a single input directed to multiple memories or parallel multiple inputs as shown with paths 1462, 1464, 1466, and 1468.

Figure 15:
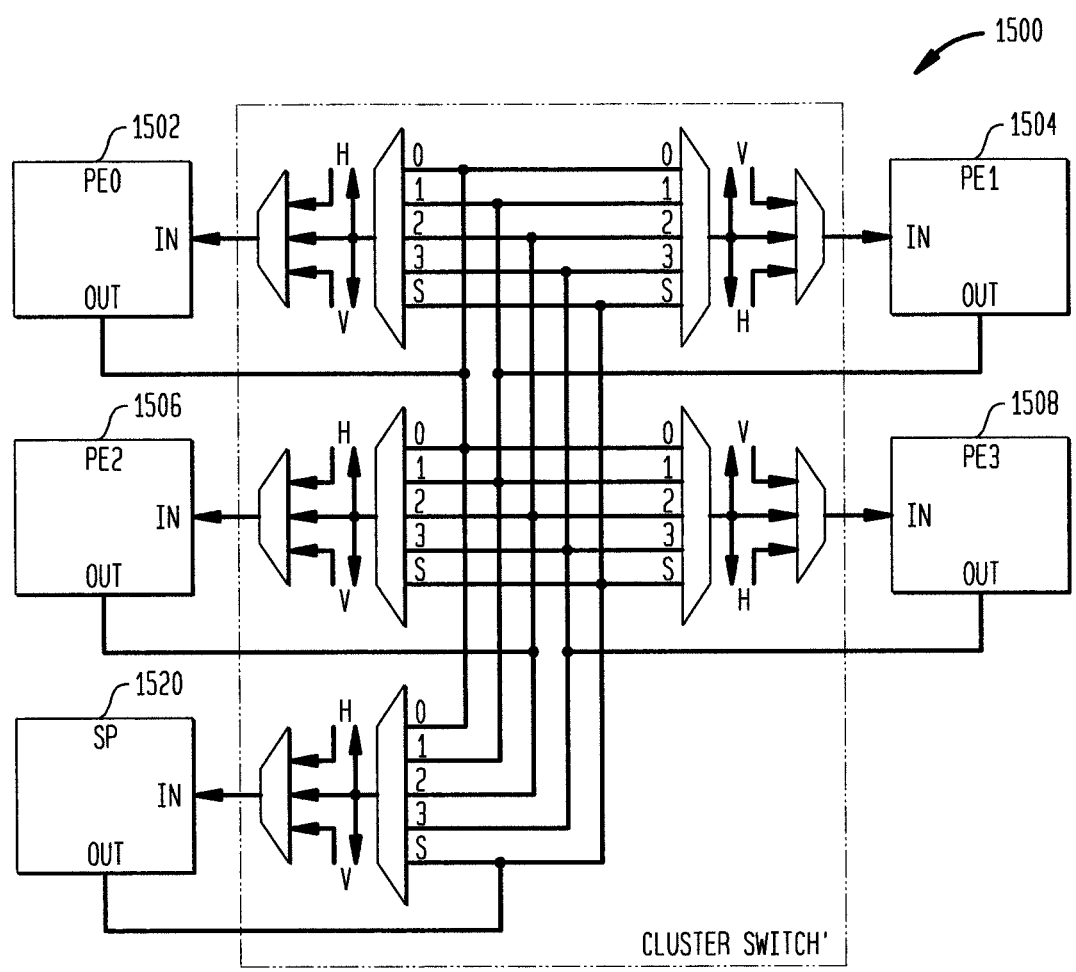
FIG. 15 illustrates the cluster switch used in the DXP2 processor in accordance with the present invention.

FIG. 15 illustrates one portion of a cluster switch 1500 for one output and one input path from each PE 1502, 1504, 1506 and 1508 in a larger network of PEs and further illustrates how an SP 1520 control processor would connect. It is noted that adding the SP processor to a cluster in the ManArray network does not impact the connectivity among the PEs but rather allows the SP to connect with the PEs with equal capability. For further detail on the ManArray network and its cluster switches, see U.S. Pat. Nos. 6,023,753, 6,167,501, 6,167,502, 6,338,129, 6,366,997, and 6,470,441. For increased connectivity between PEs where multiple output and multiple input cluster switch connection paths are provided, each PE's input/output pair could be connected as shown in FIG. 15. For example, having a second cluster switch network between the SP and PEs allows for the two networks to operate concurrently for example providing data broadcasting from the SP to the PEs on one network while PE-to-PE operations are occurring on the other network.

Figure 16:
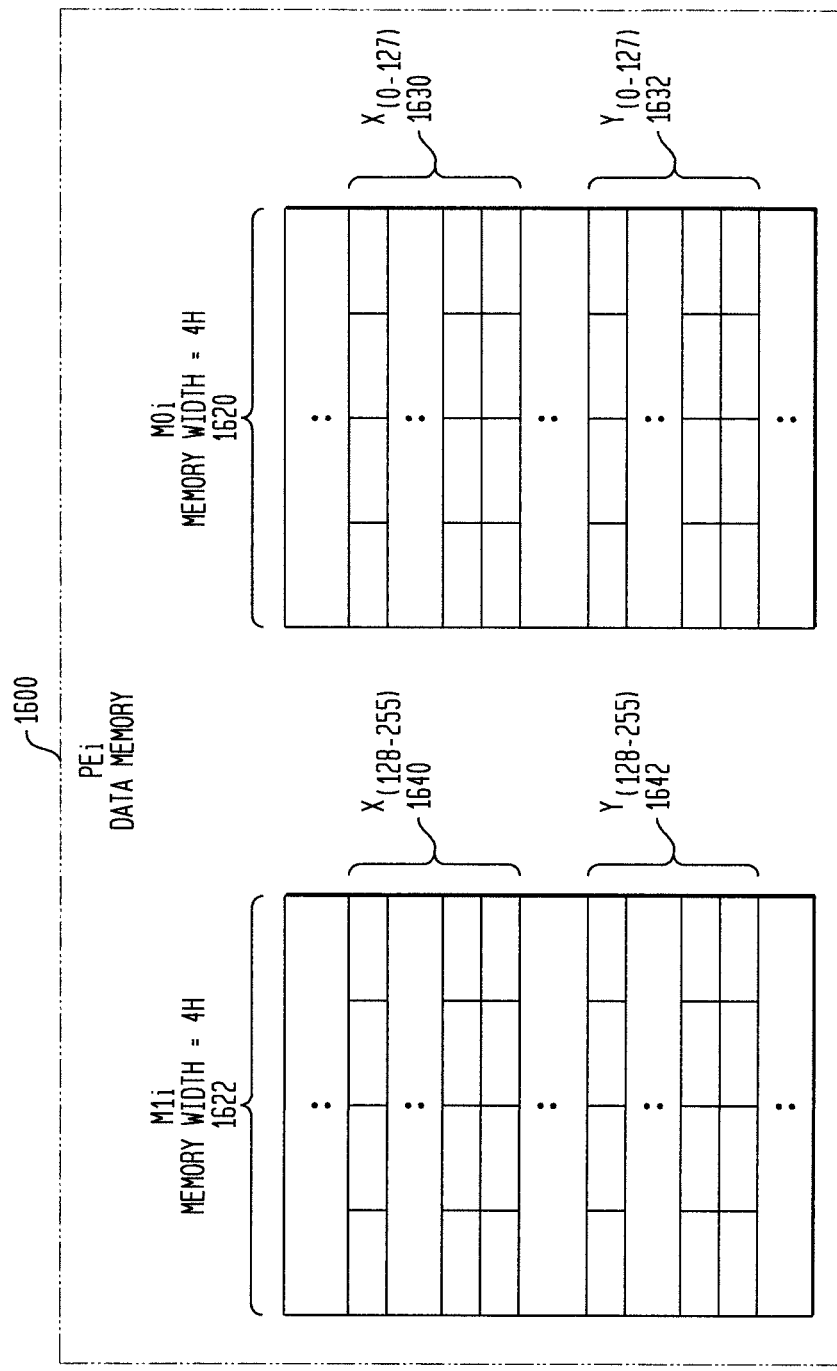
FIG. 16 illustrates the memory organization used in a single PE for the sum of product problem shown.

Next, a sum of products example is presented to further illustrate the instruction set architecture and capabilities of the DXP2 processor. FIG. 16 illustrates a memory organization 1600 for a PE and a sum of product equation 1610

$$R = \sum_{i=0}^{255} (x_i \times y_i)$$

to be solved. In the example, $x_i$ and $y_i$ are half-words stored as separate vectors in the two local PEi memories M0i 1620 and M1i 1622 which are both 64-bits wide. Input operands X and Y are stored in packed 4 halfword 4(16-bit) (4H) format. There are at least 256 multiplications and 255 additions to be done to solve this sum of products equation. The inputs X and Y are distributed in block fashion between the two memories where $X_{0-127}$ 1630 and $Y_{0-127}$ 1632 are stored in M0i 1620 and $X_{128-255}$ 1640 and $Y_{128-255}$ 1642 are stored in M1i 1622. To execute the multiplies, a packed 4H multiply instruction is used. To execute the additions, packed two-word (2W) and one-word (1W) add instructions are employed.

Figure 17:
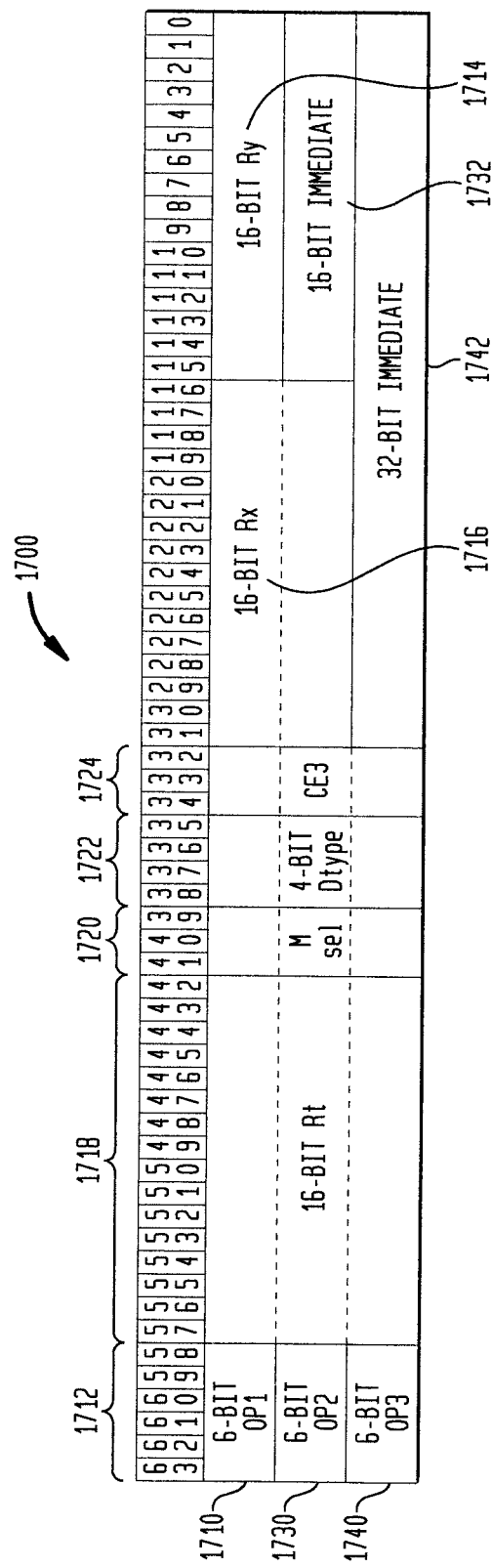
FIG. 17 illustrates three exemplary 64-bit PE arithmetic/logical instruction formats used in the DXP2 processor in accordance with the present invention.

The multiply instructions used are defined for the first stage execution units X0i and X1i as 64-bit instructions with three exemplary instruction encodings 1700 shown in FIG. 17. The Mpy.4H instruction 1710 is uniquely defined by the 6-bit opcode field 1712 and accesses two source operands Ry 1714 and Rx 1716 from the first stage memories. Since the first stage memories are large capacity memories, the operand address fields are specified as 16-bits each allowing an addressing range of $2^{16}$ or 0-65,535, of 64-bit data values for this example. A specific implementation may not require memories of this capacity as indicated in FIG. 14 where the capacity of M0i 1420 and M11 1422 are shown as 1024×64-bits. It is also noted that by use of indirect mechanisms, such as the RFI mechanism to be described in further detail for the illustrative problem, the addressing range of the operand memories can be further expanded if required by a particular design. The Rt target operand field 1718 is also of 16-bits length and a further field labeled Msel 1720 specifies in which memory or memories the target result is to be stored. Two further fields are used to specify the operation. A 4-bit Dtype field 1722 is used to specify multiple forms including single width and packed data formats and a CE3 field 1724 is used to specify the conditional execution action required. For further details on the ManArray conditional execution architecture, see U.S. Pat. No. 6,366,999. Another format of instruction encoding 1730 replaces the Ry memory operand field 1714 with an immediate 16-bit value 1732 and instruction encoding 1740 replaces both the Ry 1714 and the Rx 1716 memory operand fields with an immediate 32-bit value 1742.

Figure 18:
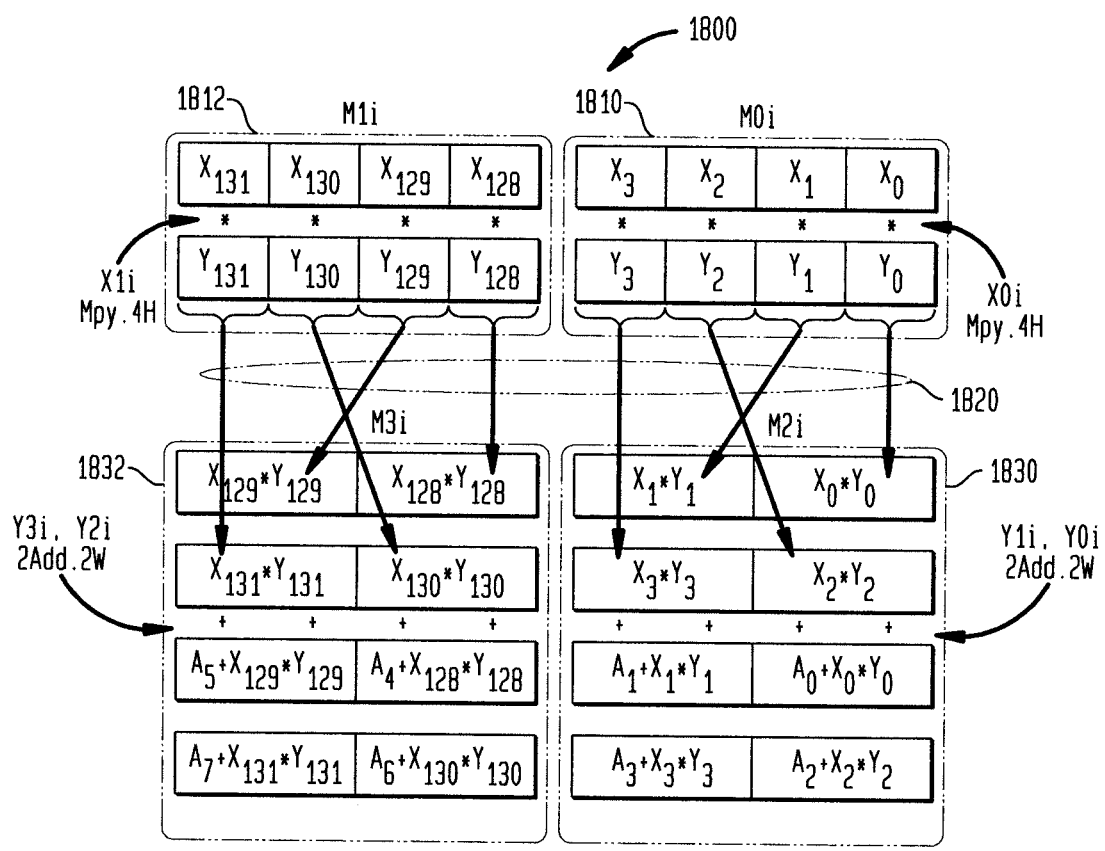
FIG. 18 illustrates an exemplary sequence of two Mpy.4H instructions followed by two Add.4W instructions illustrating the function of the Mpy.4H and Add.4W instructions in accordance with the present invention.

The basic operation sequence 1800 used to carry out the exemplary sum of product equation is depicted graphically in FIG. 18. In this figure, two Mpy.4H instructions 1810 and 1812 operate independently controlling execution units X0i and X1i to operate on source Rx=X and Ry=Y data values accessed from their associated memories M0i and M1i respectively. The results of the multiplies 1820 are written into specified Rt locations in M2i and M3i. Two Add.2W instructions 1830 and 1832 operate on execution units Y0i, Y1i and on execution units Y2i, Y3i to produce eight accumulation sums also stored in memories M2i and M3i.

Figure 19:
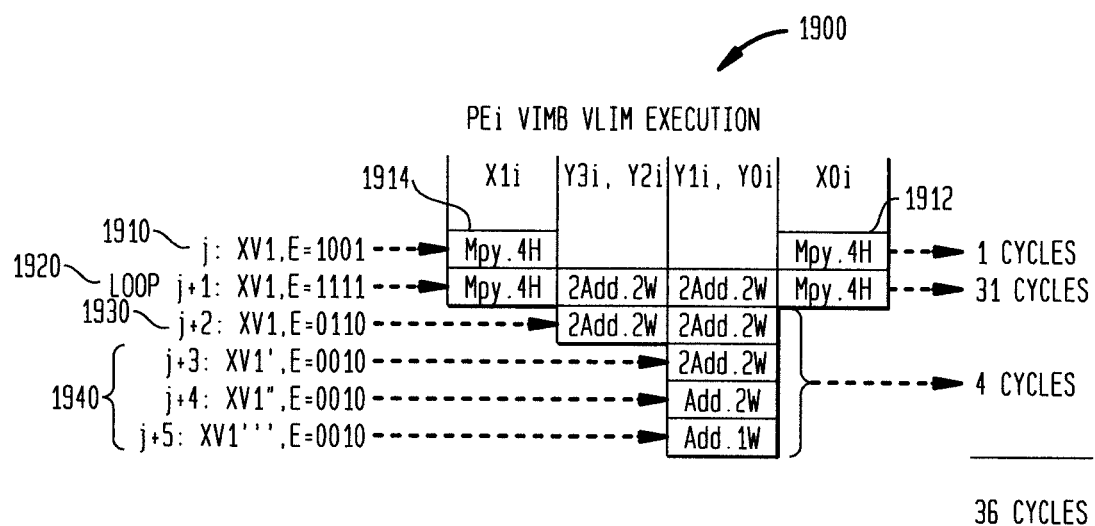
FIG. 19 illustrates an exemplary program to do the sum of 256 products on one PE in 36 cycles in accordance with the present invention.

A suitable program and VLIW execution sequence 1900 to accomplish the sum of 256 products is shown in FIG. 19. The program begins at location j 1910 where an XV1 instruction is fetched from the SP instruction memory (IMem) and distributed to PEi in cycle k. The dashed arrowed lines from the XV program to the PEi VIMB VLIW Execution indicate the relation ship of the fetched instruction to the execute stage in the pipeline for the fetched instruction and does not indicate the execute action is occurring during a fetch cycle. Specifically, in PEi, the XV1 causes an indirect fetch of a VLIW from the VIMBasket in cycle k+1 enabling two Mpy.4H 64-bit instruction slots 1912 and 1914 due to the enable bits E=1001 that are read out of the VIMB. The two instructions are decoded in cycle k+2 and executed in cycle k+3. This XV1 also causes a set of RFI values to be fetched from an RFIMemory such as RFI Memory 1236 of FIG. 12. Register file indexing provides block addressing support to the VLIWs mixing vector and VLIW capabilities. In this way, memory indexing is obtained for operand accessing with the index specified by the RFI control bits. When a VLIW is executed with RFI enabled, the first execution of the enabled instruction uses the instruction's supplied operand addresses as the starting address for blocks of data. Each time the instruction is issued thereafter an RFI generated index value is used for each RFI enabled operand address. During the execute cycle, the decode cycle of the next instruction in the pipe is occurring at which time the operand index address is updated according to the RFI control bits. The update is controlled by an increment value and a modulo value provided by the accessed RFIMemory parameters. The increment specifies a quantity that is added to the current operand address and the modulo value specifies the size of the block of data. Each operand address field in an instruction has associated with it a 10-bit parameter space 1260 in the example organization shown in FIG. 12. This 10-bit field is partitioned as follows: a 6-bit increment field specifying binary increments from 1 to 64, a 4-bit modulo field specifying block sizes of 8, 16, . . . , memory capacity. It is noted that depending upon implementation and application requirements non-binary increments, block sizes, and a larger or smaller RFI parameter space can be specified by the architecture. Additional control bits 1237 are provided, as required by a particular implementation, for each line accessed from the RFI memory. For further details on RFI operation see U.S. Pat. No. 6,446,190.

Continuing with the program description, the execution of the next instruction utilizes the RFI index addresses that were generated in the previous decode cycle. This next instruction 1920, an XV1, fetched from location j+1 in IMem when received in PEi causes the fetch at the same VIMBasket address as the previous XV1 but this time with all slots enabled with E=1111. This XV1/iVLIW is repeatedly executed for 31 cycles utilizing autolooping facilities in the processor as described in U.S. patent application Ser. No. 09/598,084 entitled "Methods and Apparatus for Generalized Event Detection and Action Specification in a Processor" filed Jun. 21, 2000. At the end of this loop, all 256 multiplications and a set of partial sums have been calculated and the final summation process needs to follow. The next instruction fetched from location j+2 an XV1 1930 causing an indirect fetch to the same VIMB address as the previous XV1 but enabling only the add operation with E=0110 The next three instructions 1940 finalize the summation of the partial sums calculated so far. The program calculates the exemplary equation in 36 cycles on a single PE. With additional PEs further improvements in performance can be obtained.

In accordance with the teachings of the present invention, an indirect deferred execution architecture can be varied and be optimized for each application or customer product. New instructions can be added to a specific implementation and easily defined to a superset architecture to provide for customer differentiation while still having each unique implementation remain a subset of the superset architecture. Consequently, the future growth of the architecture is assured.

While the present invention has been disclosed in the context of various aspects of presently preferred embodiments, it will be recognized that the invention may be suitably applied to other environments and applications consistent with the claims which follow.

We claim:

1. A processor comprising:
   two memories, each comprising a read port, a write port, and each memory separately comprising a first capacity A, wherein the write port of both memories is directly coupled to a direct memory access (DMA) interface for selected loading of data to both memories;
   two X stage execution units, each coupled to a corresponding read port of the two memories to receive a source operand from a first memory location specified by a program and coupled to the corresponding write port of the two memories to write an X stage result value to a second memory location specified by the program;
   two staging register files, each comprising a staging read port, a staging write port, and each staging register file separately comprising a second capacity B, B<A, wherein each staging write port is coupled to a corresponding X stage execution unit for selected writing of the X stage result value to a staging register file first location specified by the program; and
   two Y stage execution units, each coupled to a corresponding staging read port of the two staging register files to receive a source operand from the staging register file first location specified by the program and coupled to the corresponding staging write port of the two staging register files to write a Y stage result value to a staging register file second location specified by the program.

2. The processor of claim 1 further comprising:
an instruction storage unit for storing a plurality of X stage instructions and a plurality of Y stage instructions in an addressable entry of the instruction storage unit, wherein the plurality of X stage instructions and the plurality of Y stage instructions are accessed for execution in parallel with each other, wherein each X stage instruction configures execution controls for a corresponding memory and X stage execution unit and each Y stage instruction configures execution controls for a corresponding staging register file and Y stage execution unit.

3. The processor of claim 2, wherein each X stage instruction specifies read-addressing information to fetch a source operand from the corresponding memory, and store-addressing information to store a result value generated in the corresponding X stage execution unit in the corresponding memory and each Y stage instruction specifies read-addressing information to fetch a source operand from the corresponding staging register file, and store-addressing information to store a result value generated in the corresponding Y stage execution unit in the corresponding staging register file.

4. The processor of claim 1 further comprising:
a very long instruction word (VLIW) storage unit for storing the program comprising a plurality of X stage instructions and a plurality of Y stage instructions in an addressable VLIW entry of the VLIW storage unit, wherein the plurality of X stage instructions and the plurality of Y stage instructions encoded in a VLIW are accessed for execution in parallel with each other, wherein each X stage instruction configures execution controls for a corresponding memory and X stage execution unit and each Y stage instruction configures execution controls for a corresponding staging register file and Y stage execution unit.

5. A method for execution of instructions using staging register files, the method comprising:
executing a first X stage arithmetic function instruction that specifies a first address, a first function, and a second address to read a first M1 data element from the first address in an M1 memory, operate on the first M1 data element according to the first function in a first X stage arithmetic function execution unit to generate a first X stage result, and store the first X stage result at the second address in a first staging register file, wherein a direct memory access (DMA) interface directly loads data to the M1 memory including the first M1 data element; and
executing a first Y stage instruction that specifies the second address, a second function, and a third address to read the first X stage result from the second address in the first staging register file, operate on the first X stage result according to the second function in a first Y stage execution unit to generate a first Y stage result and store the first Y stage result at the third address in the first staging register file.

6. The method of claim 5 further comprising:
executing a second X stage arithmetic function instruction that specifies a fourth address, a third function, and a fifth address in parallel with the first X stage arithmetic function instruction to read a first M2 data element from the fourth address in an M2 memory, operate on the first M2 data element according to the third function in a second X stage arithmetic function execution unit to generate a second X stage result, and store the second X stage result at the fifth address in a second staging register file, wherein the DMA interface directly loads data to the M2 memory including the first M2 data element; and
executing a second Y stage instruction that specifies the fifth address, a fourth function, and a sixth address in parallel with the first Y stage instruction to read the second X stage result from the fifth address in the second staging register file, operate on the second X stage result according to the fourth function in a second Y stage execution unit to generate a second Y stage result and store the second Y stage result at the sixth address in the second staging register file.

7. The method of claim 5, wherein the first Y stage instruction is executed in a pipelined Y stage that follows the execution of the first X stage arithmetic function instruction in a pipelined X stage to ensure the first X stage results are available to be read from the first staging register file.

8. A computer readable non-transitory medium encoded with computer readable program data and code, the program data and code when executed operable to:
execute a first X stage arithmetic function instruction that specifies a first address, a first function, and a second address to read a first M1 data element from the first address in an M1 memory, operate on the first M1 data element according to the first function in a first X stage arithmetic function execution unit to generate a first X stage result, and store the first X stage result at the second address in a first staging register file, wherein a direct memory access (DMA) interface directly loads data to the M1 memory including the first M1 data element; and
execute a first Y stage instruction that specifies the second address, a second function, and a third address to read the first X stage result from the second address in the first staging register file, operate on the first X stage result according to the second function in a first Y stage execution unit to generate a first Y stage result and store the first Y stage result at the third address in the first staging register file.

9. The computer readable non-transitory medium of claim 8 further operable to:
execute a second X stage arithmetic function instruction that specifies a fourth address, a third function, and a fifth address in parallel with the first X stage arithmetic function instruction to read a first M2 data element from the fourth address in an M2 memory, operate on the first M2 data element according to the third function in a second X stage arithmetic function execution unit to generate a second X stage result, and store the second X stage result at the fifth address in a second staging register file, wherein the DMA interface directly loads data to the M2 memory including the first M2 data element; and
execute a second Y stage instruction that specifies the fifth address, a fourth function, and a sixth address in parallel with the first Y stage instruction to read the second X stage result from the fifth address in the second staging register file, operate on the second X stage result according to the fourth function in a second Y stage execution unit to generate a second Y stage result and store the second Y stage result at the sixth address in the second staging register file.

10. The processor of claim 1 further comprising:
two additional Y stage execution units, each coupled to a corresponding additional staging read port of the two staging register files to receive an additional source operand and coupled to a corresponding additional write port of the two staging register files to write an additional Y stage result value.

11. The processor of claim 1, wherein the processor is an array of processing elements (PEs) and the PEs are coupled to each other through a cluster switch to communicate a result value generated in an execution unit.

12. The method of claim 5 further comprising:
storing the first Y stage result in the M1 memory.

13. The method of claim 6 further comprising:
storing the first Y stage result in the second staging register file; and
storing the second Y stage result in the first staging register file.

14. The method of claim 6 further comprising:
storing the first Y stage result in the M2 memory; and
storing the second Y stage result in the M1 memory.

15. The method of claim 5, wherein the first X stage arithmetic function instruction is encoded in an instruction format having a source operand address field of sufficient capacity to address the M1 memory, wherein the M1 memory has a capacity significantly greater than a capacity of the first staging register file.

16. The method of claim 6 further comprising:
accessing a first very long instruction word (VLIW) encoded with the first X stage arithmetic function instruction and the second X stage arithmetic function instruction to be decoded and executed in parallel; and
accessing a second VLIW following the accessing of the first VLIW, the second VLIW encoded with the first Y stage instruction and the second Y stage instruction to be decoded and executed in parallel.

17. The method of claim 6, wherein the first X stage arithmetic function instruction and the second X stage arithmetic function instruction both comprise separately encoded functions including arithmetic functions, logic functions, and cluster switch functions.

18. The method of claim 5, wherein executing the first X stage arithmetic function instruction further comprises:
reading the first M1 data element and a second M1 data element from the M1 memory to be operated on in the first X stage arithmetic function execution unit to generate a first X stage second result, wherein the reading of the first M1 data element and the second M1 data element provides an effective load bandwidth of two load units for the M1 memory.

19. The method of claim 6, wherein executing the second X stage arithmetic function instruction further comprises:
reading the first M2 data element and a second M2 data element from the M2 memory to be operated on in the second X stage arithmetic function execution unit to generate a second X stage second result, wherein the reading of the first M2 data element and the second M2 data element provides an effective load bandwidth of two load units for the M2 memory.

20. The computer readable non-transitory medium of claim 9 further operable to:
access a first very long instruction word (VLIW) encoded with the first X stage arithmetic function instruction and the second X stage arithmetic function instruction to be decoded and executed in parallel; and
access a second VLIW following the accessing of the first VLIW, the second VLIW encoded with the first Y stage instruction and the second Y stage instruction to be decoded and executed in parallel.

* * * * *